United States Patent
Campbell

(10) Patent No.: US 10,116,873 B1
(45) Date of Patent: Oct. 30, 2018

(54) SYSTEM AND METHOD TO ADJUST THE FIELD OF VIEW DISPLAYED ON AN ELECTRONIC MIRROR USING REAL-TIME, PHYSICAL CUES FROM THE DRIVER IN A VEHICLE

(71) Applicant: Ambarella, Inc., Santa Clara, CA (US)

(72) Inventor: Jeffery Campbell, San Jose, CA (US)

(73) Assignee: Ambarella, Inc., Santa Clara, CA (US)

( * ) Notice: Subject to any disclaimer, the term of this patent is extended or adjusted under 35 U.S.C. 154(b) by 198 days.

(21) Appl. No.: 14/935,688

(22) Filed: Nov. 9, 2015

(51) Int. Cl.
| H04N 7/18 | (2006.01) |
| B60R 1/00 | (2006.01) |
| H04N 5/232 | (2006.01) |
| G02B 5/08 | (2006.01) |
| G06K 9/00 | (2006.01) |
| G06K 9/52 | (2006.01) |
| G06T 7/60 | (2017.01) |
| H04N 5/225 | (2006.01) |

(52) U.S. Cl.
CPC ........... *H04N 5/23296* (2013.01); *B60R 1/00* (2013.01); *G02B 5/08* (2013.01); *G06K 9/00268* (2013.01); *G06K 9/00832* (2013.01); *G06K 9/52* (2013.01); *G06T 7/60* (2013.01); *H04N 5/2252* (2013.01); *G06T 2207/30268* (2013.01)

(58) Field of Classification Search
CPC . B60R 1/00; B60R 2300/20; B60R 2300/105; H04N 7/181; H04N 13/0239; H04N 5/23238
USPC ..................................................... 348/14, 38
See application file for complete search history.

(56) References Cited

U.S. PATENT DOCUMENTS

| 7,245,741 | B1* | 7/2007 | Ertl ................... B60R 21/01538 180/277 |
| 2002/0003571 | A1* | 1/2002 | Schofield ................ B60C 23/00 348/148 |
| 2007/0058257 | A1* | 3/2007 | Lynam ................. B60Q 1/2665 359/604 |
| 2010/0020170 | A1* | 1/2010 | Higgins-Luthman ....................... B60Q 1/1423 348/135 |
| 2014/0293169 | A1* | 10/2014 | Uken ........................ B60R 1/12 349/12 |
| 2015/0175172 | A1* | 6/2015 | Truong ................. B60W 50/10 701/36 |
| 2015/0251605 | A1* | 9/2015 | Uken ...................... B60R 19/28 248/467 |
| 2015/0314736 | A1* | 11/2015 | Hughes ................... B60R 11/04 348/148 |

(Continued)

*Primary Examiner* — Andy Rao
*Assistant Examiner* — Zaihan Jiang
(74) *Attorney, Agent, or Firm* — Christopher P. Maiorana, PC

(57) ABSTRACT

An apparatus comprising a first sensor, a second sensor and a processor. The first sensor may be configured to generate a first video signal based on a targeted view from a vehicle. The second sensor may be configured to generate a second video signal based on a targeted view of a driver. The processor may be configured to (A) receive the first video signal, (B) receive the second video signal, (C) determine a field of view to present to the driver, (D) generate a third video signal and (E) present the third video signal to a display showing the field of view. The field of view is determined based on (i) a body position of the driver extracted from the second video signal and (ii) the first video signal.

19 Claims, 13 Drawing Sheets

(56) References Cited

U.S. PATENT DOCUMENTS

| | | | |
|---|---|---|---|
| 2016/0137126 A1* | 5/2016 | Fursich | B60R 1/00 348/38 |
| 2016/0159251 A1* | 6/2016 | Ebina | B60N 2/0244 701/49 |
| 2016/0185297 A1* | 6/2016 | Boehm | B60R 1/12 348/148 |
| 2016/0209647 A1* | 7/2016 | Fursich | G02B 27/0093 |
| 2016/0297362 A1* | 10/2016 | Tijerina | H04N 7/181 |
| 2016/0377873 A1* | 12/2016 | Kimura | B60K 35/00 345/682 |

* cited by examiner

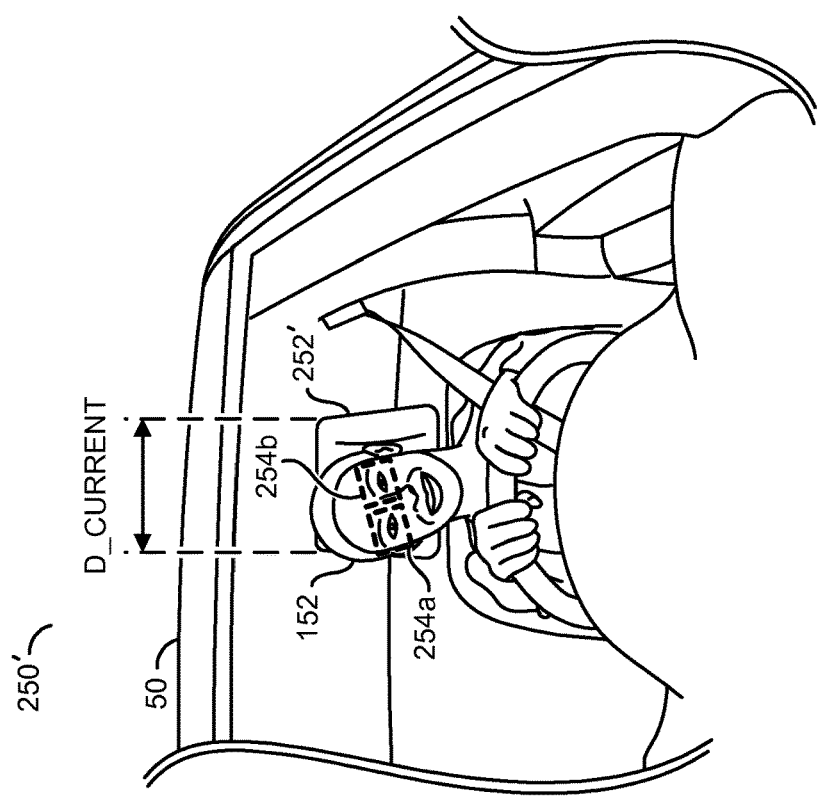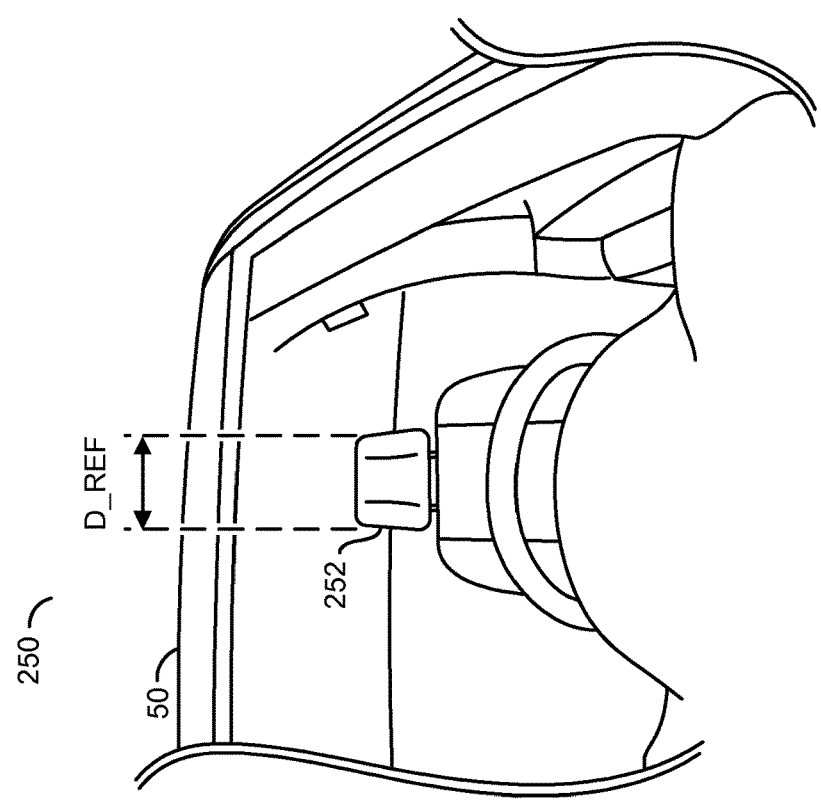
FIG. 6

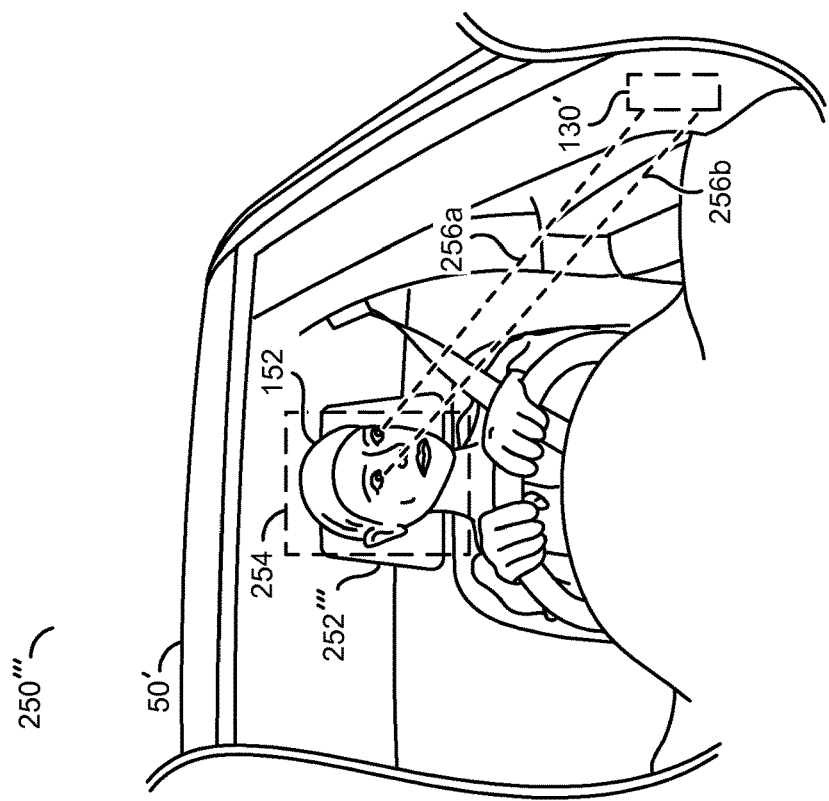
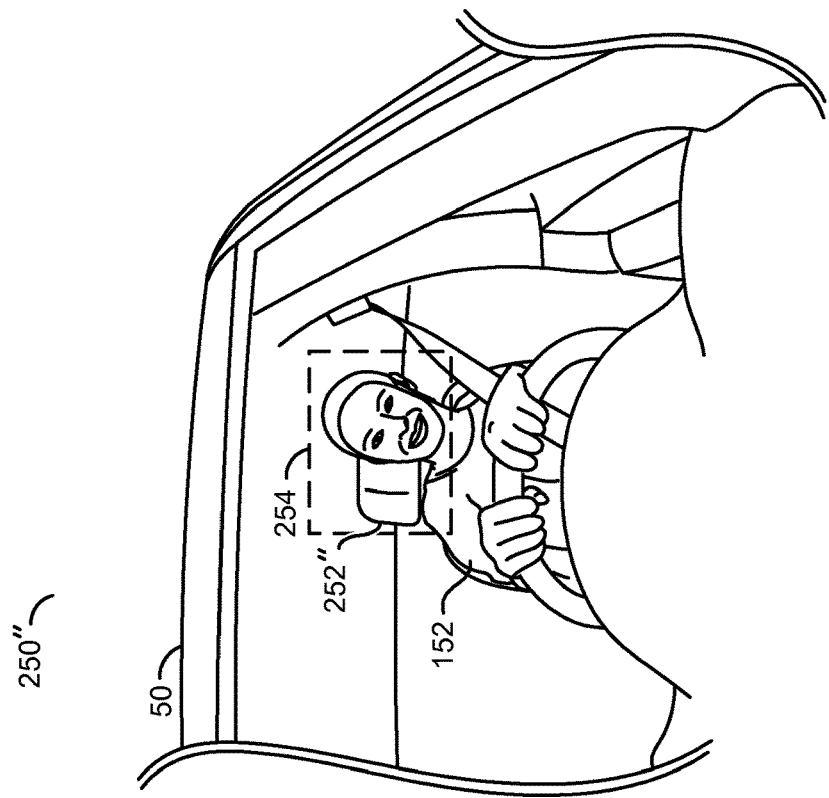
FIG. 7

SYSTEM AND METHOD TO ADJUST THE FIELD OF VIEW DISPLAYED ON AN ELECTRONIC MIRROR USING REAL-TIME, PHYSICAL CUES FROM THE DRIVER IN A VEHICLE

This application relates to U.S. Ser. No. 14/639,479, filed Mar. 5, 2015, which is incorporated by reference in its entirety.

FIELD OF THE INVENTION

The present invention relates to video capture devices generally and, more particularly, to a system and method to adjust the field of view displayed on an electronic mirror using real-time, physical cues from the driver in a vehicle.

BACKGROUND OF THE INVENTION

Electronic mirrors (e-mirrors) developed for modern automobiles offer advantages over traditional optical (or reflective) glass based mirrors. Advantages of electronic mirrors include an increased visibility when attempting to view scenes during nighttime when surrounding objects are obstructed by darkness, an ability to display scenes captured by a camera system showing a high dynamic range (HDR) of luminosity and improved vehicle aerodynamics to allow for increased fuel efficiency by replacing side wing mirrors protruding from a vehicle with lower profile camera modules. However, the current approach of capturing and displaying a fixed field of view (FOV) for the camera subsystem capturing the rear view scene for either center rear or side wing mirrors has limitations.

When using traditional mirrors the driver is able to slightly move their head or body and in doing so alters the field of view being reflected. The driver can easily and quickly view a wide variety of angles of view in an intuitive manner to cover a wide field of view and allow for safer operation of the automobile. Being able to quickly view a wide variety of angles of view is especially useful for tasks such as changing lanes and backing up.

Moving the head or body in a similar fashion when using an e-mirror system where a fixed camera system feeds a monitor does not have the same effect. A fixed camera system cannot change the display on the e-mirror to react to the behavior of the driver to provide the various angles of view that are reflected in a traditional reflective mirror. Blind spots may be present outside of the fixed field of view of the camera that cannot be captured by the camera system or displayed on the e-mirror.

It would be desirable to implement a system and method to adjust the field of view displayed on an electronic mirror using real-time physical cues from the driver in a vehicle.

SUMMARY OF THE INVENTION

The present invention concerns an apparatus comprising a first sensor, a second sensor and a processor. The first sensor may be configured to generate a first video signal based on a targeted view from a vehicle. The second sensor may be configured to generate a second video signal based on a targeted view of a driver. The processor may be configured to (A) receive the first video signal, (B) receive the second video signal, (C) determine a field of view to present to the driver, (D) generate a third video signal and (E) present the third video signal to a display showing the field of view. The field of view is determined based on (i) a body position of the driver extracted from the second video signal and (ii) the first video signal.

The objects, features and advantages of the present invention include providing a system and method to adjust the field of view displayed on an electronic mirror using real-time, physical cues from the driver in a vehicle that may (i) react to a body/head position of a driver, (ii) monitor movements of the driver, (iii) determine when the driver is attempting to look outside of a current field of view displayed on an e-mirror, (iv) adjust a camera in response to the physical cues of the driver, (v) digitally transform captured video data in response to the physical cues of the driver, (vi) emulate a reflective view from a mirror, (vii) alter a capture window location for a wide-angle video frame and/or (viii) be easy to implement.

BRIEF DESCRIPTION OF THE DRAWINGS

These and other objects, features and advantages of the present invention will be apparent from the following detailed description and the appended claims and drawings in which:

FIG. 6 is a diagram illustrating eye detection and object size comparison;

FIG. 7 is a diagram illustrating detection of body position, head position and head rotation;

DETAILED DESCRIPTION OF EMBODIMENTS

Figure 1:
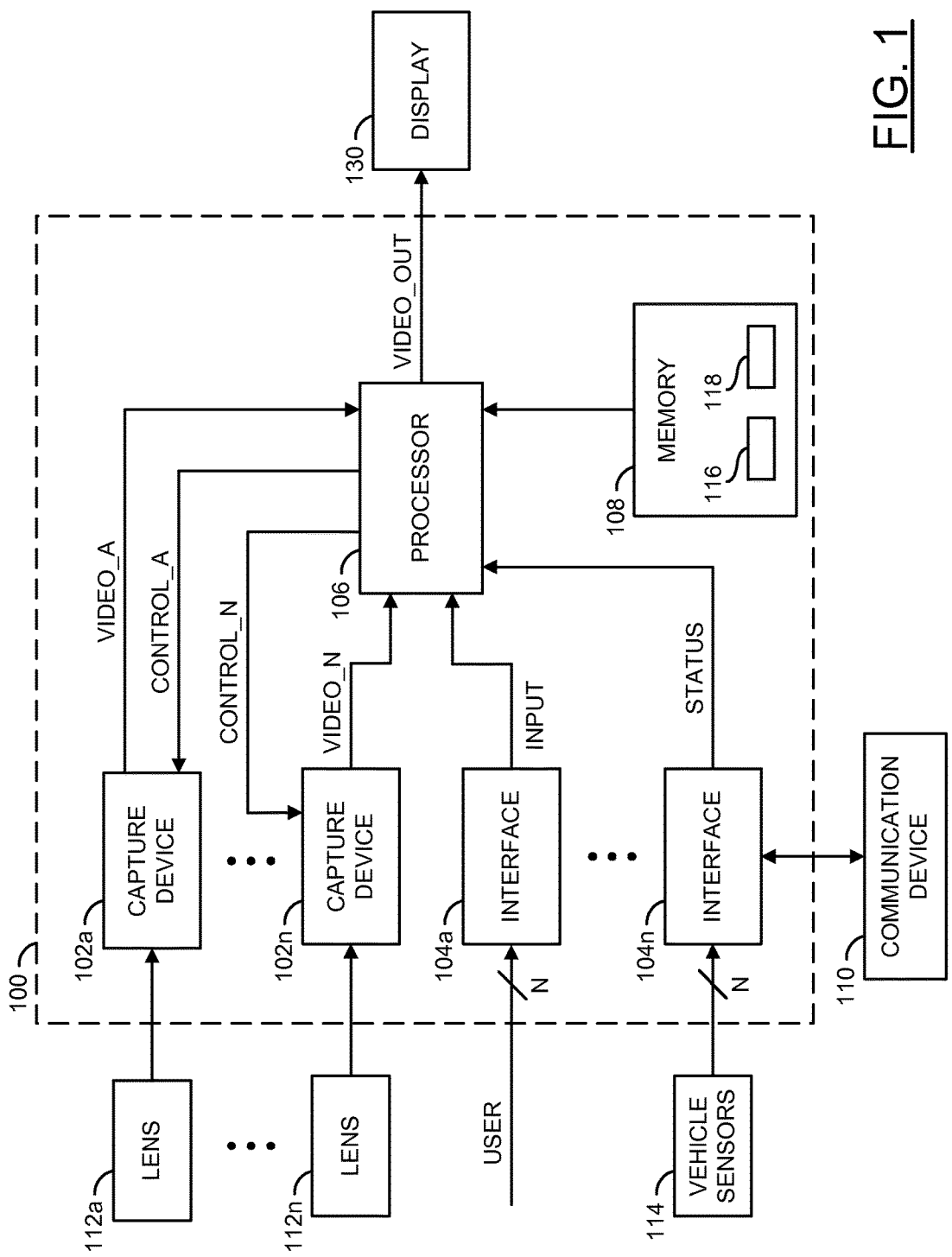
FIG. 1 is a block diagram of an example embodiment of an apparatus.

Referring to FIG. 1, a block diagram of an apparatus 100 is shown in accordance with an embodiment of the present invention. The apparatus 100 may be a camera system. The camera system 100 may comprise blocks (or circuits) 102a-102n, blocks (or circuits) 104a-104n, a block (or circuit) 106, and a block (or circuit) 108. The circuits 102a-102n may implement various capture devices. The circuits 104a-104n may implement various interfaces. The circuit 106 may be configured as a processor. The circuit 108 may be configured as a memory. The memory 108 may be configured to store computer readable/executable instructions (or firmware). The instructions, when executed by the processor 106, may perform a number of steps.

The camera system 100 is shown connected to a block (or circuit) 110, blocks (or circuit) 112a-112n, a block (or circuit) 114 and a block (or circuit) 130. The circuit 110 may be an external communication device. In some embodiments, the communication device 110 may be implemented as part of the camera system 100. The blocks 112a-112n may be lenses (e.g., a camera lens). In some embodiments, the lenses 112a-112n may be implemented as part of the camera system 100. The circuit 114 may represent various vehicle sensors. Generally, each of the lenses 112a-112n corresponds with one of the capture devices 102a-102n.

A combination of one of the lenses 112a-112n, one of the capture devices 102a-102n and/or other components (e.g., the processor 106) may be used to implement a camera. In some embodiments, the cameras may be high-resolution and/or ultra high-resolution (e.g., 4K Ultra HD) cameras. In some embodiments, the cameras may provide ultra-low-light imaging, 180/360-degree dewarping, wide-angle viewing, image stabilization and/or high dynamic range imaging. In some embodiments, the cameras may implement H.264 low bitrate streaming technology to reduce bandwidth requirements. In some embodiments, the cameras may implement performance from 1080p60 to 4Kp60 with support for multiple streams and/or transcoding between H.264 and H.265 formats. In some embodiments, the cameras may implement wide dynamic range (WDR), smart auto-exposure and/or full-resolution oversampling to allow the capture of license plates and/or other details. The cameras may be implemented using compact form factor hardware packages (e.g., 14 mm×14 mm, 11 mm×11 mm, etc.) to allow for very small and/or miniature sized cameras.

The circuit 114 may be implemented as one or more sensors (e.g., a location module such as a GPS sensor, an orientation module such as a magnetometer, a temperature sensor, steering wheel sensors, turn indicator signals, any other data communicated via a vehicle on-board diagnostic (OBD) port, etc.). Generally, the sensors 114 may be input/output devices separate from the capture devices 102a-102n. The circuit 130 may be a display device (e.g., a LCD display). The display 130 may be implemented as an electronic mirror (e.g., an eMirror).

In some embodiments, the communication device 110 and/or the sensors 114 may be implemented as part of the camera system 100 (e.g., internal components of the camera system 100). In some embodiments, the communication device 110 and/or the sensors 114 may be components available to the camera system 100 (e.g., pre-installed components of a vehicle). In some embodiments, the camera system 100 may be implemented as a drop-in solution (e.g., installed as one component).

The capture devices 102a-102n may present one or more signals (e.g., VIDEO_A-VIDEO_N) to the processor 106. The interfaces 104a-104n may present various signals to the processor 106. The interface 104a is shown presenting a signal (e.g., INPUT) to the processor 106. The interface 104n is shown presenting a signal (e.g., STATUS) to the processor 106. Other signals may be presented to the processor 106 by the interfaces 104a-104n (e.g., from the communication device 110, from other components and/or from other connections). The number and/or types of signals presented by the various interfaces 104a-104n may be varied according to the design criteria of a particular implementation.

The interfaces 104a-104n may receive various inputs. For example, the interface 104a is shown receiving an input (e.g., USER). The input USER may be an instruction provided by a driver. Other types of input may be received by the interface 104a (e.g., signals generated by various components of a vehicle, signals received from sources external to a vehicle, etc.). In another example, the interface 104n is shown receiving status information signals from the vehicle sensors 114. In yet another example, the interface 104n is shown communicating with the communication device 110. The types of input signals received by the interfaces 104a-104n may be varied according to the design criteria of a particular implementation.

The processor 106 may be configured to receive the signals VIDEO_A-VIDEO_N, the signal INPUT, the signal STATUS and/or other inputs. The processor 106 may be configured to generate a signal (e.g., VIDEO_OUT) and/or one or more signals (e.g., CONTROL_A-CONTROL_N). The signals VIDEO_OUT and/or CONTROL_A-CONTROL_N may be generated based on a decision made by the processor 106. The decision made by the processor 106 may be determined based on the inputs received by the processor 106 (e.g., the signal INPUT, the signal STATUS and/or other inputs) and/or based on an analysis of the signals VIDEO_A-VIDEO_N.

The signal VIDEO_OUT may be presented to the display 130. The signal VIDEO_OUT may be a transformed version of one or more of the signals VIDEO_A-VIDEO_N. For example, the signal VIDEO_OUT may be a subset (e.g., a cropped version) of one or more of the signals VIDEO_A-VIDEO_N. The signal VIDEO_OUT may comprise one or more video frames (e.g., a series of video frames). The signals CONTROL_A-CONTROL_N may be presented to one or more of the capture devices 102a-102n.

The signals CONTROL_A-CONTROL_N may be used to manipulate the cameras associated with the capture devices 102a-102n. For example, the signals CONTROL_A-CONTROL_N may be used to physically move the cameras associated with the capture device 102a-102n. In another example, the signals CONTROL_A-CONTROL_N may be used to instruct the capture devices 102a-102n to perform a digital manipulation of captured video data. The inputs, outputs and/or arrangement of the components of the camera system 100 may be varied according to the design criteria of a particular implementation.

The processor 106 may be configured to present multiple output video signals in response to the single signals VIDEO_A-VIDEO_N received from the capture devices 102a-102n. The processor 106 may be configured to transform the signals VIDEO_A-VIDEO_N into two or more separate video output signals. For example, one output video signal may be a series of video frames with one field of view (e.g., corresponding to a field of view for a driver side view mirror) and another output video signal may be a series of video frames with an alternate field of view (e.g., corresponding to a field of view for a passenger side view mirror). The field of view (FOV) of the output video signals may be varied according to the design criteria of a particular implementation.

The memory 108 is shown comprising a block (or circuit) 116 and a block (or circuit) 118. The circuit 116 may be configured as a lookup table. The circuit 118 may be a data storage portion of the memory 108. The memory 108 may comprise other portions (e.g., instructions, free memory, application-specific storage, shared memory, etc.). The type of data stored in the memory 108 may be varied according to the design criteria of a particular implementation.

The camera system 100 may be implemented as two or more regular digital cameras and/or depth-sensing cameras. The sensors 114 may be implemented on-board the camera system 100 and/or connected externally (e.g., via the interface 104). The processor 106 may analyze the captured video content (e.g., the signal VIDEO_A-VIDEO_N) in real time to detect objects and/or extract data from the video.

Figure 2:
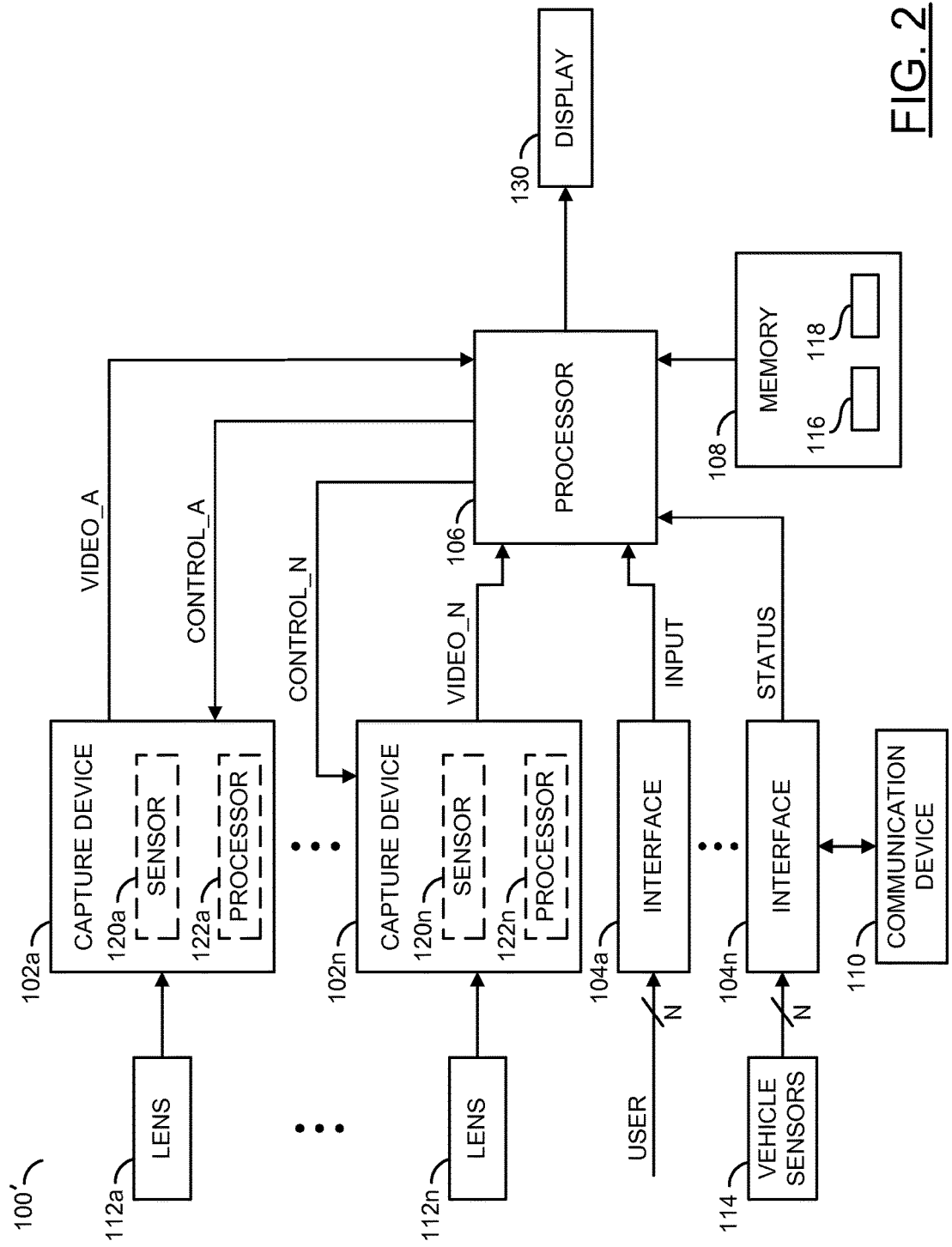
FIG. 2 is a block diagram of another example embodiment of an apparatus.

Referring to FIG. 2, a block diagram of an apparatus 100' is shown in accordance with an embodiment of the present invention. The camera system 100' may comprise the capture devices 102a-102n, the interfaces 104a-104n, the processor 106, the memory 108, the communication device 110, the lenses 112a-112n, the vehicle sensors 114 and/or the display 130. The camera system 100' may be a distributed system (e.g., each component may be implemented separately throughout an installation location such as a vehicle). The capture devices 102a-102n may each comprise a corresponding block (or circuit) 120a-120n and/or a corresponding block (or circuit) 122a-122n.

The circuits 120a-120n may be camera sensors (e.g., a camera sensor separate from the sensors 114). The circuits 122a-122n may be processors (e.g., a processor separate from the processor 106). The capture devices 102a-102n may implement a separate internal memory (e.g., a memory separate from the memory 108 such as a frame buffer). Each of the camera sensors 102a-102n may comprise a corresponding one of the sensors 120a-120n, a corresponding one of the processors 122a-122n and/or other components (e.g., an internal memory) implemented in an enclosure (e.g., a camera enclosure).

Figure 3:
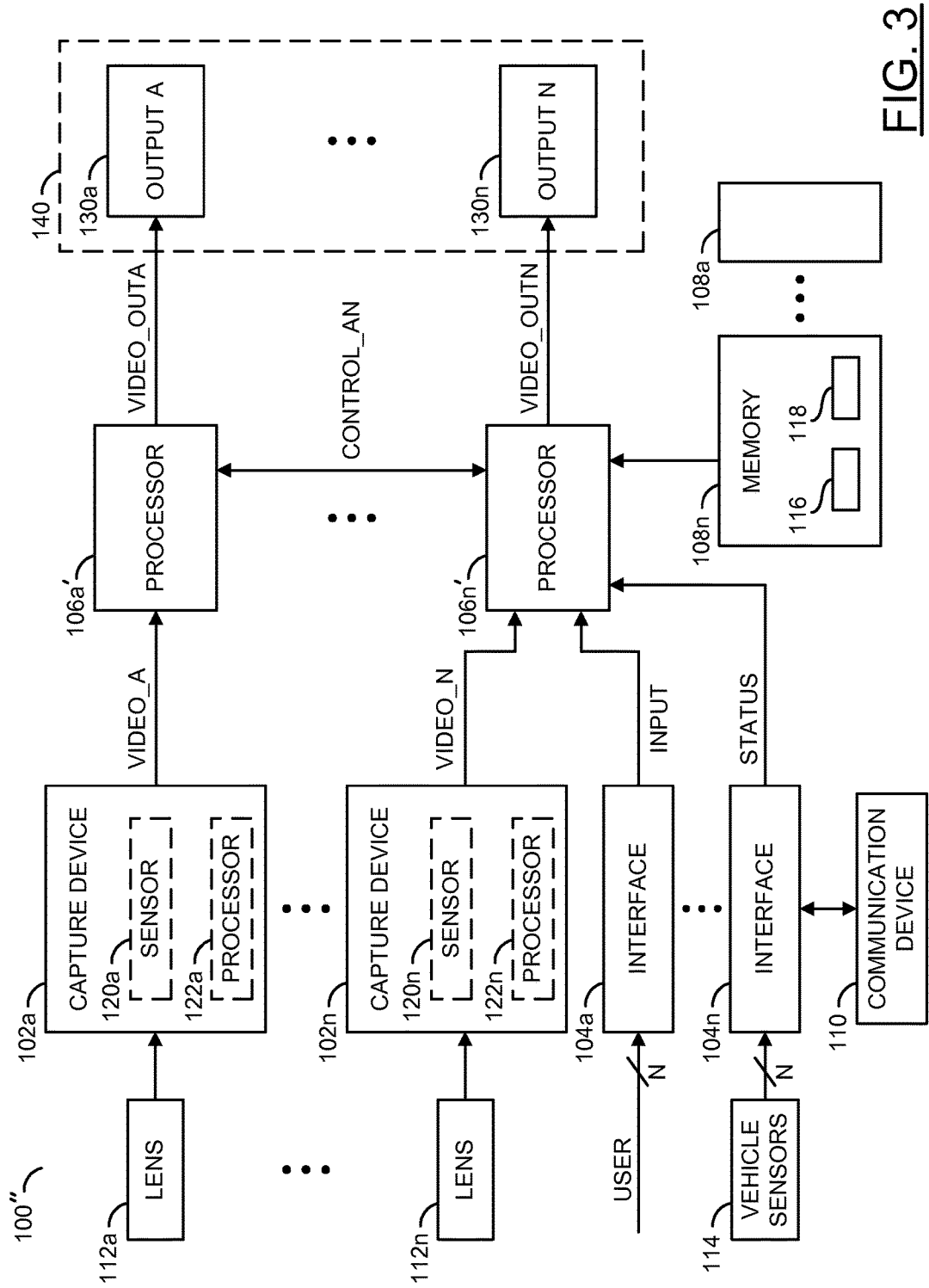
FIG. 3 is a block diagram of an example embodiment of an apparatus configured to have multiple image sensors and multiple processors.

Referring to FIG. 3, a block diagram of an example embodiment of an apparatus 100" configured to have multiple image sensors and multiple processors is shown. The camera system 100" may comprise the capture devices 102a-102n, the interfaces 104a-104n, multiple processors 106a'-106n', multiple memory circuits 108a-108n, the communication device 110, the lenses 112a-112n and the output block 140. Each of the capture devices 102a-102n may generate a video signal (e.g., the video signals VIDEO_A-VIDEO_N). Each of the video signals VIDEO_A-VIDEO_N may be presented to a corresponding processor 106a'-106n'.

In some embodiments, each of the processors 106a'-106n' may be connected to a corresponding one of the memory circuits 108a-108n. In some embodiments, each of the processors 106a'-106n' may share a common memory (e.g., the memory 108). Each of the processors 106a'-106n' may generate a corresponding output signal (e.g., VIDEO_OUTA-VIDEO_OUTN). Each of the output signals VIDEO_OUTA-VIDEO_OUTN may be presented to the output block 140 (e.g., to one of the corresponding output eMirrors 130a-130n). For example, the output block 140 may be a processor and/or an output array of display devices.

The processor 140 may receive the signals VIDEO_OUTA-VIDEO_OUTN and transmit the signals VIDEO_OUTA-VIDEO_OUTN to a corresponding display 130a-130n. For example, the display 130a may be a driver side view mirror, the display 130b may be a center rear view mirror, the display 130c may be a passenger side view mirror, etc. The number of displays 130a-130n and/or the number of processors 106a'-106n' may be varied according to the design criteria of a particular implementation.

Each of the processors 106a'-106n' may generate the control signal. The control signal may be presented to another one of the processors 106a'-106n' and/or one of the capture devices 102a-102n. In the example shown, a signal (e.g., CONTROL_AN) is shown connected between the processor 106a' and the processor 106n'. The signal CONTROL_AN may allow the processors 106a' and 106n' to communicate with each other.

In some embodiments, the signal CONTROL_AN may be bi-directional. For example, a bi-directional control signal may be implemented between each of the processors 106a'-106n' (e.g., a control signal CONTROL_AB between processors 106a' and 106b', a control signal CONTROL_BN between the processors 106b' and 106n', etc.). In some embodiments, there may be multiple uni-directional control signals between each of the processors 106a'-106n'. In some embodiments, the control signal may be provided to the capture devices 102a-102n to provide instructions to manipulate (e.g., physically and/or digitally) the captured video data. In some embodiments, the control signal may be provided to another one of the processors 106a'-106n' to provide instructions to manipulate (e.g., digitally) the captured video data.

For example, one processor (e.g., 106a') may distill information from the video feed VIDEO_A and use the information to control another camera (e.g., a combination of the lens 112n, the capture devices 102n and/or the processor 106n') via the signal CONTROL_AN. In another example, the processor 106a' may pass distilled visual cues (e.g., information extracted from the signal VIDEO_A) to the processor 106n' via the signal CONTROL_AN. In yet another example, the processor 106n' may pass higher level directives on how to modify a physical position and/or a digital capture window of another camera (e.g., the combination of the lens 112a, the capture device 102a and/or the processor 106a') via the signal CONTROL_AN.

Figure 4:
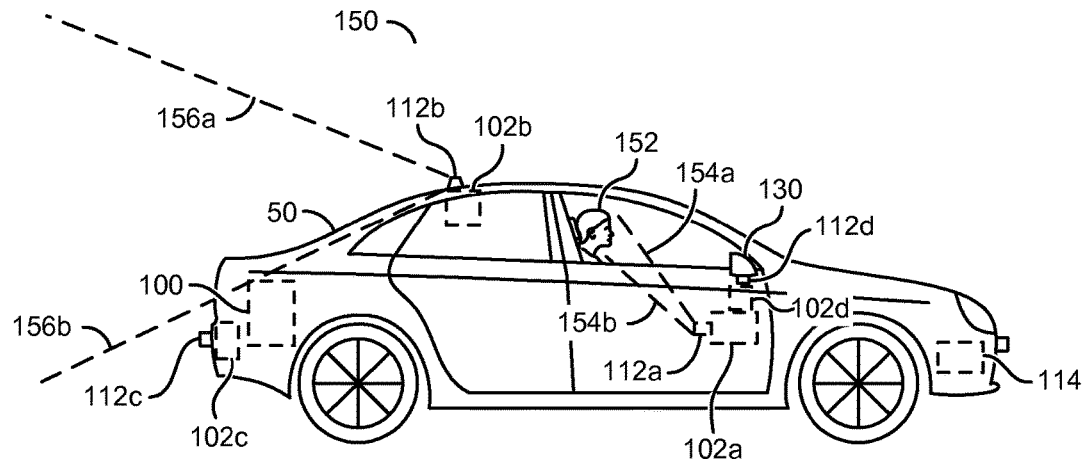
FIG. 4 is a diagram illustrating an external view of a vehicle.

Referring to FIG. 4, an embodiment 150 illustrating the capture device 102a detecting the driver of an automobile/vehicle 50 is shown. The camera system 100 is shown inside the vehicle 50. The capture device 102a is shown inside the vehicle 50. A driver 152 is shown seated in the vehicle 50. The side view mirror may be the display device (e.g., electronic mirror) 130 to provide a side view to the driver 152. The vehicle sensors 114 are shown on (or in) the vehicle 50.

In the embodiment 150, the electronic mirror 130 is shown on the exterior of the vehicle 50. In some embodiments, the electronic mirror 130 may be implemented as part of the interior of the vehicle 50 (e.g., as part of a door panel, as part of a dashboard, mounted above a windshield, etc.). The location of the electronic mirror 130 may be varied according to the design criteria of a particular implementation.

The camera system 100 is shown in the rear of the vehicle 50. A location of the camera system 100 may be varied according to the design criteria of a particular implementation. For example, in some embodiments, the vehicle 50 may allow for installation of the camera system 100 in a rear end of the vehicle 50. In other embodiments, the vehicle 50 may allow for installation of the camera system 100 in a front end of the vehicle 50. For example, the camera system 100 may be installed near and/or with the capture device 102a (e.g., in a dashboard of the vehicle 50). In another example, the camera system 100 may be distributed throughout the vehicle 50 (e.g., connections may be implemented between the camera system 100 and the capture devices 102a-102d and/or the display device 130 such as a direct wired connection and/or a connection using a common bus line).

The camera (e.g., the lens 112a and the capture device 102a) is shown detecting the driver 152. A targeted view of the driver 152 (e.g., represented by a line 154a and a line 154b) is shown being captured by the capture device 102a. The targeted view 154a-154b is shown directed at the head of the driver 152. The capture device 102a may also detect other objects in the vehicle 50 (e.g., a seat, a head rest, an arm rest, a rear window, a seatbelt, a center console, etc.). By analyzing video of the driver 152 (e.g., extracting video data from the captured video), the processor 106 may determine a body position (e.g., a distance, orientation and/or location of the body and/or head) of the driver 152 and/or a field of view to present to the driver 152 on the display 130.

In some embodiments, more than one of the capture devices 102a-102n may be used to capture video data of the driver 152. A combination of inputs from driver facing cameras may be implemented to detect changes in head/face movements. For example, using multiple cameras may improve the accuracy of depth information. The number of cameras used and/or the type of data extracted from the video data from the driver monitoring cameras may be varied according to the design criteria of a particular implementation.

A camera (e.g., a combination of the lens 112b, the capture device 102b and/or the processor 106b) is shown capturing a targeted view from the vehicle 50. In the example shown, the targeted view from the vehicle (e.g., represented by a line 156a and a line 156b) is shown capturing a view to the rear of (e.g., behind) the vehicle 50. The targeted view 156a-156b may be implemented to capture a view that is similar (e.g., emulating) and/or transformed to be similar to a reflective view from a conventional (e.g., reflective) side-view mirror. The targeted view 156a-156b may represent video data from a perspective of the vehicle 50.

Other view directions may be captured. Other cameras may be used to capture video data of a targeted view from the vehicle (e.g., shown as the lens 112c and the camera sensor 102c, the lens 112d and the camera sensor 102d, etc.). In one example, the lens 112b is shown positioned above a back windshield of the vehicle 50 (e.g., roughly where an antenna fin is commonly positioned on various vehicle makes and models). In another example, the lens 112c is shown positioned on the rear bumper of the vehicle 50. In yet another example, the lens 112d is shown positioned underneath the side eMirror 130.

The lenses 112b-112d (and the corresponding camera sensors 102b-102d) may implement rear-facing cameras. By analyzing the video data from the targeted view 156a-156b and/or other views, the processor 106 may present a field of view to display on the eMirror 130. The number of cameras implemented, a direction captured, an orientation of the cameras and/or an arrangement of the cameras may be varied according to the design criteria of a particular implementation.

The electronic mirror 130 may be a video display screen and/or an output device. The electronic mirror 130 may be operational in combination with the capture devices 102a-102n and/or the processor 106. The electronic mirror 130 may display a version of video frames (e.g., the targeted view from the vehicle 50) captured by one or more of the lenses 112a-112n and/or the capture devices 102a-102n. The video frames captured by the lenses 112a-112n and/or the capture devices 102a-102n may be transformed, adjusted and/or encoded by the processor 106. The transformed, adjusted and/or encoded video frames may be displayed by the electronic mirror 130.

The electronic mirror 130 may display a field of view to the driver 152. The field of view displayed on the electronic mirror 130 may be similar (e.g., emulate) a field of view reflected when looking at a traditional mirror. For example, the processor 106 may provide real-time video streaming to the electronic mirror 130. Decisions made by the processor 106 to determine the field of view to select for display on the eMirror 130 may be automated based on status information from the vehicle 50 (e.g., provided by the signal STATUS) and/or information extracted from monitoring the driver 152. Selecting between the various fields of view may provide video frames to the electronic mirror 130 that provide the driver 152 alternate viewing angles and/or widths.

The vehicle sensors 114 are shown attached to (or in) the vehicle 50. Multiple types of the vehicle sensors 114 may be implemented. The vehicle sensors 114 may be used to determine the status information (e.g., the signal STATUS). In some embodiments, the vehicle sensors 114 may communicate with an OBD port of the vehicle 50. For example, the vehicle sensors 114 may monitor a direction of the steering wheel. The direction of the steering wheel may be used to determine which field of view to display on the electronic mirror 130. In another example, turn signals may be monitored. The activation of the turn signals by the driver 152 may indicate which direction the vehicle 50 may be moving. The direction of the vehicle may be used to select an appropriate field of view to display on the electronic mirror 130.

The vehicle sensors 114 may be configured as a blind-spot detection system. The sensors 114 may be implemented using proximity detection technology. Blind-spot detection systems may implement more than one sensor. For example, blind-spot detection systems may use multiple radars and/or sonars. The sensor array 114 may be used to determine the position of objects in close proximity to the vehicle 50. For example, the vehicle sensors 114 may implement a radar device, an array of radars, a sonar device, an array of sonars, a LIDAR device, an array of LIDAR devices, an ultra-sound device, an array of ultra-sound devices, etc. The sensors 114, the processor 106 and/or one or more capture devices (e.g., a capture device directed towards the driver 152) may be used to estimate the blind spot and/or possible blind zones of the driver 152. The types of the vehicle sensors 114 used to detect a proximity to other objects may be varied according to the design criteria of a particular implementation.

Figure 5:
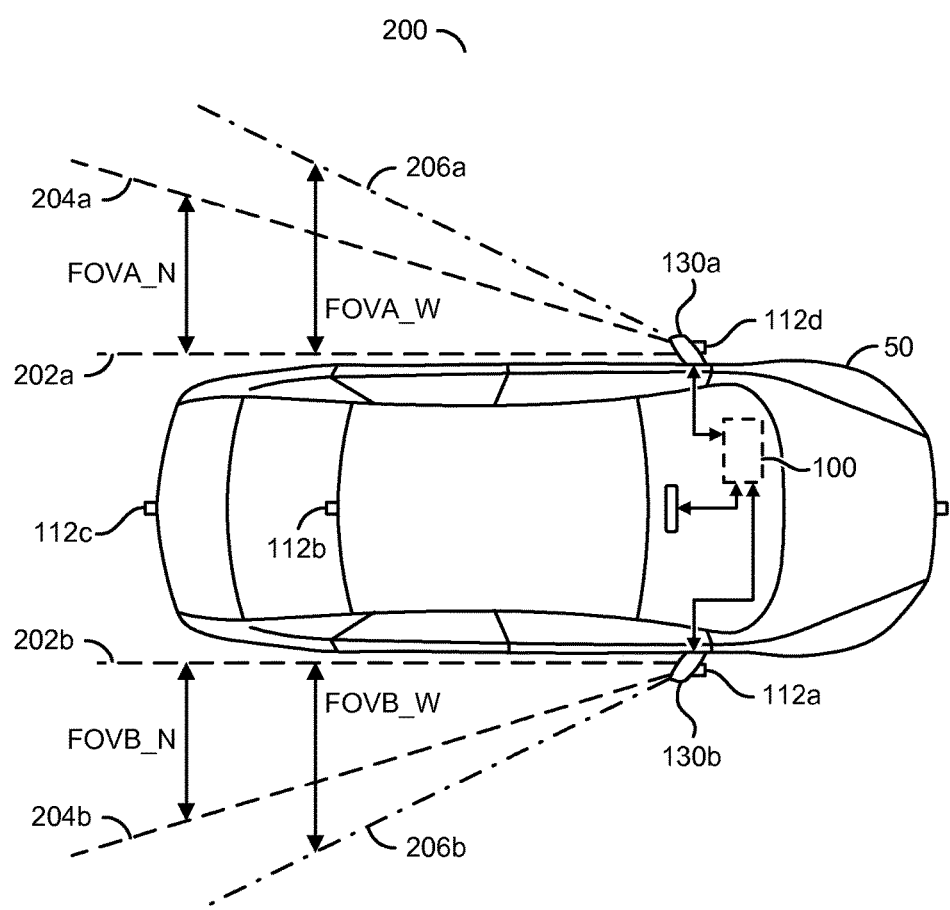
FIG. 5 is a diagram illustrating wide and narrow fields of view.

Referring to FIG. 5, an embodiment 200 illustrating a wide field of view (e.g., FOVA_W) and a narrow field of view (e.g., FOVA_N) is shown. The fields of view FOVA_W and FOVA_N are shown displayed from the electronic mirror 130a. The field of the view may represent a measure of a size/width of a view. The narrow field of view FOVA_N may be a view between a line 202a and a line 204a. The wide field of view FOVA_W may be a view between the line 202a and a line 206a.

The field of view FOVA_N may have a corresponding field of view (e.g., FOVB_N) from the electronic mirror 130b. Similarly, the field of view FOVA_W may have a corresponding field of view (e.g., FOVB_W) from the electronic mirror 130b. The field of view FOVA_N and the field of view FOVB_N are shown having a similar coverage. However, the coverage of the field of view FOVA_N and FOVB_N may be the same, or may be different. Similarly, the field of view FOVA_W and FOVB_W may have a similar coverage, or may have a different coverage. In particular, the view that a driver sees from the electronic mirror 130a may be designed to be slightly different than the view seen by the driver 152 from the electronic mirror 130b.

The fields of view FOVA_N, FOVA_W, FOVB_N and/or FOVB_W may be presented to the displays 130a and/or 130b by the camera system 100. For example, the fields of view FOVA_N, FOVA_W, FOVB_N and/or FOVB_W may be displayed based on the signal VIDEO_OUT, generated by the processor 106. Selecting between the fields of view FOVA_N, FOVA_W, FOVB_N and/or FOVA_W may be based on a decision made by the processor 106. The fields of view FOVA_N, FOVA_W, FOVB_N and/or FOVB_W may represent examples of fields of view that the processor 106 may determine to present to the driver 152 on the eMirror 130.

In some embodiments, the decision made by the processor 106 may be based on the body position of the driver 152. For example, the driver video data (e.g., captured by the capture device 102a in the example shown in FIG. 4) may be analyzed to determine a location of the head and/or body of the driver 152 and/or determine a direction of the gaze of the driver 152. The processor 106 may determine whether the driver 152 is attempting to look outside of a field of view displayed on the eMirror 130 and make corresponding adjustments. For example, if the driver 152 is determined to be attempting to look farther to the left, the processor 106 may adjust the field of view displayed on the eMirror 130 to show closer to the vehicle 50.

Generally, the adjustments made by the processor 106 to the field of view displayed on the eMirror 130 may correspond as much as possible to the changes in view a driver would see when looking into a traditional (e.g., glass, plastic, etc.) reflective mirror. In some embodiments, the decision made by the processor 106 may be based on the objects detected in the signals VIDEO_A-VIDEO_N (e.g., the processor 106 may select which of the fields of view FOVA_N and/or FOVA_W are displayed on the electronic mirror 130a based on the objects detected in the signals VIDEO_A-VIDEO_N).

The FOVs (e.g., FOVA_N, FOVA_W, FOVB_N and/or FOVB_W) may be determined by the processor 106 and displayed on the eMirror 130. The FOVs may represent a range of view when the driver 152 looks at the eMirror 130. The FOVs may change based on the body position of the driver 152. The camera system 100 may be implemented to calculate an appropriate FOV to display on the eMirror 130 to approximate what a driver would see when in a similar body position when looking at a traditional reflective mirror.

The camera system 100 may determine the corresponding FOVs for each of the eMirrors 130a-130n of the vehicle 50. A number of FOVs may be determined (e.g., one for each of the eMirrors 130a-130n of the vehicle 50). For example, the vehicle 50 may have three eMirrors (e.g., the two side view eMirrors and the rear view eMirror) and there may be three corresponding FOVs determined by the camera system 100. The FOVs may be updated in real-time as the driver 152 moves. For example, the FOVs displayed on the eMirrors 130a-130n may be calculated based on characteristics of the driver 152 (height, preferences, etc.) and/or characteristics of the vehicle 50 (size, obstructions, visible zones, etc.).

In some embodiments, the camera system 100 may be installed in the vehicle 50 at a time of manufacturing. For example, the camera system 100 may be installed on a particular type (e.g., model, make, year, etc.) of vehicle 50 and the camera system 100 may store pre-determined status information about the vehicle 50 (e.g., a size, seat positioning, range of view of the mirrors, known sizes of particular objects, etc.).

In some embodiments, the camera system 100 may be installed in the vehicle 50 as a separate component (e.g., an after-market part). In one example, the camera system 100 may be designed and/or sold for a particular make/model of the vehicle 50 and store pre-determined status information (e.g., in the memory 108). In another example, the camera system 100 may be programmable and the status information may be entered in the camera system 100 based on the status information of the vehicle 50. For example, an online database may be implemented with status information for various types of vehicles (e.g., make, model, year, etc.) and the status information may be downloaded and stored in the camera system 100. The implementation of the camera system 100 in the vehicle 50 and/or a method of storing information about the vehicle 50 may be varied according to the design criteria of a particular implementation.

Referring to FIG. 6, video frames 250 and 250' illustrating eye detection and object size comparison are shown. The video frames 250 and 250' may be video frames generated by the capture device 102a (e.g., one of the capture devices directed at the driver 152). The video frames 250 and/or 250' may represent a targeted view captured by the lens 112a mounted on the dashboard of the vehicle 50. The view captured for each of the video frames may be varied according to the design criteria of a particular implementation.

The video frame 250 may represent a reference frame. For example, the reference frame 250 may be stored in the memory 108 (e.g., in the data portion 118). The reference frame 250 shows an object of known size 252 in the vehicle 50. The object of known size 252 may be a head rest of the driver side seat. The processor 106 and/or the processor 122a may determine the width of the object of known size 252 (e.g., based on the number of pixels occupied in the video frame). The memory 108 may store (e.g., in the lookup table 116) the width of the object of known size 252 (e.g., D_REF). The width D_REF may be determined when the object of known size 252 is at a known distance from the lens 112a. The width D_REF may be stored in the memory 108 as the reference size.

The video frame 250' may represent a current frame. For example, the capture device 102a may send the signal VIDEO_A as the current frame to the processor 106. In another example, the processor 122a may generate and/or analyze the current frame 250' (e.g., the current frame 250' may be stored in a memory of the capture device 102a) and send a result of the analysis (e.g., the location of the eyes of the driver 152) to the processor 106. The current frame 250' shows the vehicle 50, the driver 152 and an object of known size 252'. The current frame 250' may be analyzed by the processor 106 and/or one of the processors 122a-122n. The processor 106 and/or the processor 122a may detect the eyes of the driver 152. Boxes 254a-254b may represent the detected eyes of the driver 152 in the current frame 250'.

The object of known size 252 and/or 252' may be an object physically connected to the seat of the driver 152. For example, the object of known size 252 and/or 252' may be the head rest as shown. In some embodiments, the object of known size 252 and/or 252' may be the seat of the driver 152, an arm rest of the seat of the driver 152 and/or a seat belt. Other objects in the reference frame 250 and/or the current frame 250' may have a known size (e.g., a steering wheel, a rear seat, a dashboard, a sunroof, a moonroof, etc.) but may be unsuitable for determining a distance of the driver 152 from the lens 112a (e.g., objects that generally have a fixed position in the video frames).

The distance of the driver 152 from the lens 112a may be estimated based on the object of known size 252 and/or 252' and characteristics of the driver 152. For example, if the headrest 252' is determined to be 4.5 feet away from the lens 112a an average sitting posture and head size may be used to estimate that the eyes of the driver 152 may be 3.5 feet from the lens 112a. The characteristics of the driver 152 and/or the estimations performed may be varied according to the design criteria of a particular implementation.

The processor 106 and/or the processor 122a may be configured to detect the object of known size 252' in the current frame 250'. The object of known size 252' may be the head rest. The head rest 252' is shown closer in the current frame 250' than the head rest 252 in the reference frame 250. The processor 106 and/or the processor 122 may determine the width of the object of known size 252' (e.g., the number of pixels in the video frame). The memory 108 may store the width of the object of known size 252' (e.g., D_CURRENT). The width D_CURRENT may be used as the current size of the object of known size 252'. The current size D_CURRENT may be compared to the reference size D_REF by the processor 106 and/or the processor 122. Based on the comparison of the current size D_CURRENT and the reference size D_REF, the processor 106 and/or the processor 122 may estimate a distance of the driver 152 from the lens 112.

Using the detected eyes 254a-254b and the estimated distance of the driver 152 from the lens 112, the processor 106 and/or the processor 122 may determine the position (e.g., 3D coordinates and/or location coordinates) of the eyes of the driver 152. For example, the location of the detected eyes 254a-254b may represent one coordinate (e.g., a location coordinate on a first axis) for a vertical location of each eye in 3D space, and one coordinate (e.g., a location coordinate on a second axis) for a horizontal location of each eye in 3D space. The determined distance from the lens 112 may represent one coordinate (e.g., a location coordinate on a third axis) for a depth location of each of the detected eyes 254a-254b in 3D space. For example, the processor 122 may determine the location of the detected eyes 254a-254b in 3D space and transmit the location (e.g., using one of the signals VIDEO_A-VIDEO_N) to the processor 106.

Based on the determined position/location of the eyes of the driver 152 (e.g., the body position of the driver) and the video data from the perspective of the vehicle 50 (e.g., the targeted view 156a-156b), the processor 106 may determine the FOV to display on the eMirror 130. In some embodiments, the processor 106 may generate one or more of the signals CONTROL_A-CONTROL_N to provide instructions to one of the other cameras (e.g., the cameras capturing the view from the perspective of the vehicle 50). The signals CONTROL_A-CONTROL_N may provide instructions for adjusting cameras (e.g., digitally and/or physically).

Referring to FIG. 7, video frames 250" and 250'" illustrating detecting body position, head position and head rotation are shown. The video frame 250' may be an example of a current video frame. The video frame 250" shows the driver 152 leaning towards the driver side door. The driver 152 may be leaning to check the eMirror 130. Generally, a driver leans over when checking a traditional reflective side view mirror to see a field of view outside the view reflected when the driver is sitting upright. The processor 106 may be configured to generate an output video signal to the display 130 that changes when the body position of the driver 152 changes. For example, the display 130 may be updated to correspond to the body position (e.g., the location of the head, face, body and/or gaze) of the driver 152.

The processor 106 may extract the body position of the driver 152 from the video frame 250". For example, the processor 106 may perform video analytics based on machine learning on the video frames of the video signal (e.g., VIDEO_A). A box 254 is shown to represent the processor 106 detecting the body position of the driver 152. For example, the processor 106 may detect that the head of the driver has moved towards the driver side door. In another example, the processor 106 may detect that the object of known size 252" (e.g., the head rest) is in the video frame and the head of the driver 152 is also in the video frame. A number of pixels may be measured between the reference object 252" and the head of the driver 152 to determine location co-ordinates of the head of the driver 152.

The location co-ordinates of the head of the driver 152 may be used by the processor 106 to determine the FOV to output to the eMirror 130. For example, the capture window of the output video signal (e.g., VIDEO_OUT) may be moved in relation to the number of pixels that the head of the driver 152 has been determined to have moved across. The processor 106 may implement a machine learning to model a relationship between body position movements of the driver 152 and FOVs to display on the eMirror 130 to approximate how FOVs would change when a driver is looking in a traditional reflective mirror. The machine learning model may learn to emulate a view from a traditional reflective mirror as seen from a point of view of the driver 152.

The video frame 250'" shows the driver 152 rotating their head to look at the eMirror 130'. The video frame 250'" may be an example of a current video frame. The eMirror 130' is shown built into a door panel of the vehicle 50. The box 254 may represent the processor 106 detecting the rotation of the head of the driver 152. Using video analytics, the processor 106 may determine a direction of the gaze of the driver 152.

Lines 256a-256b may represent an approximation of the gaze of the driver 152 performed by the processor 106. The processor 106 may determine the FOV that should be shown on the display 130' based on the body position of the driver 152. For example, a calculation may be performed to determine the angle of reflection that would appear if the driver 152 in the same body position was looking at a reflective mirror. In some embodiments, the processor 106 may adjust the capture window from the video data from the perspective of the vehicle 50 (e.g., the video signal VIDEO_N) to provide the FOV that is similar to the reflection that would appear when looking at a reflective mirror. In some embodiments, the processor 106 may generate one or more of the signals CONTROL_A-CONTROL_N to provide instructions to the camera (e.g., the lens 112n and/or the capture device 102n) to physically adjust the camera to capture the FOV that is similar to the reflection that would appear when looking at a reflective mirror.

The processor 106 may track the detected gaze 256a-256b of the driver 152. When the gaze 256a-256b changes, the processor 106 may determine whether the driver is attempting to look outside of the current FOV displayed on the eMirror 130'. When the driver 152 is determined to be looking outside of the current FOV displayed on the eMirror 130', the processor 106 may adjust the output video VIDEO_OUT.

Figure 8:
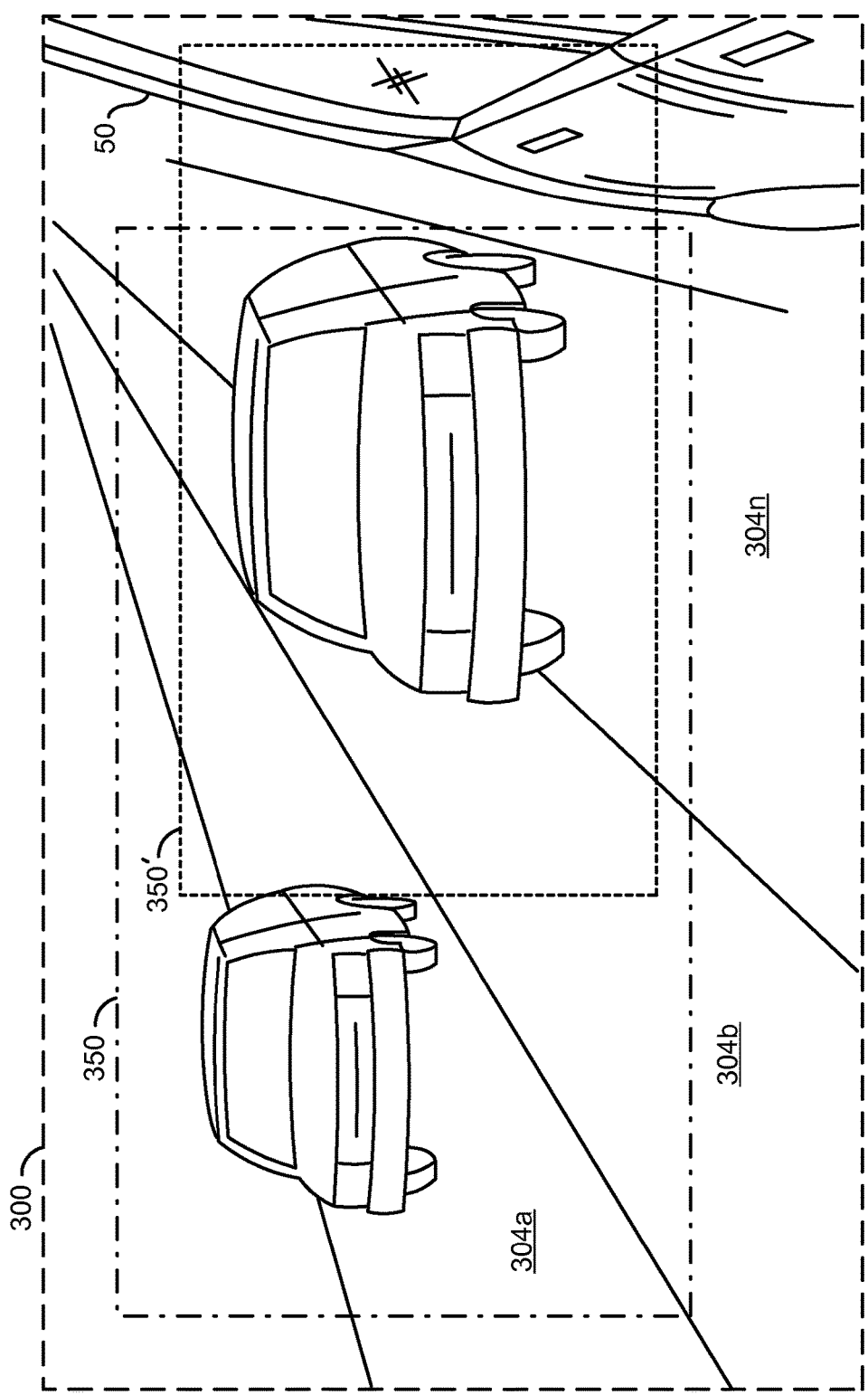
FIG. 8 is a diagram illustrating an example video frame.

Referring to FIG. 8, an example video frame 300 is shown. The frame 300 may represent a targeted view from the vehicle 50 captured by one of the capture device 102a-102n. For example, the video frame 300 may be captured using the lens 112d mounted on the eMirror 130 shown in FIG. 4. The frame 300 shows a vehicle 302a, a vehicle 302b and a portion of the vehicle 50 (e.g., the passenger side). The vehicles 302a-302b may be objects detected by the processor 106. The vehicle 302a may be traveling in a lane 304a. The vehicle 302b may be traveling in a lane 304n.

The video frame 300 may be one of the frames of one or more of the signals VIDEO_A-VIDEO_N captured by one or more of the capture devices 102a-102n (e.g., via the lenses 112a-112n). For example, the video frame 300 may be a combination of multiple frames from the capture devices 102a-102n that have been transformed by the processor 106 to create a combined video frame. The video frame 300 is generally wide enough to show both the vehicle 302a and the vehicle 302b. The processor 106 will determine which portions of the video frame 300 to present on the display 130 (or 130a-130n).

An example capture window 350 and an alternate example capture window 350' are shown on the video frame 300. The capture window 350 and/or 350' may be a subset of the video frame 300. The capture window 350' may be an example of the processor 106 transforming (e.g., moving and/or scaling) the capture window 350. The capture window 350 and/or 350' may be the FOV output on the eMirror 130. The processor 106 may determine a location, size, shape, and/or zoom level for the capture window. For example, the capture window 350 is shown having a different size compared to the capture window 350'. In another example, the capture window 350 is shown having a different location than the capture window 350'.

The processor 106 may crop the capture window 350 and/or 350' from the video frame 300 to provide output to the eMirror 130. Generally, one capture window may be output to one electronic mirror display output. However, multiple capture windows corresponding to the video frame 300 may be an output source for different electronic mirrors (e.g., the capture window 350 may be output to a center rear view electronic mirror, and the capture window 350' may be output to a side wing electronic mirror).

The processor 106 may adjust the capture window in response to the body position of the driver 152. For example, the processor 106 may position the capture window 350 when the driver 152 is sitting upright. When the processor 106 determines the body position of the driver 152 has changed (e.g., the driver 152 leans to look outside the current FOV displayed on the eMirror 130), the processor 106 may move the capture window 350 to the capture window 350'. The signal VIDEO_OUT may correspond to the capture window (e.g., the capture window 350 and/or the capture window 350'). In some embodiments, the capture window may be set to pre-determined locations (e.g., in response to the signal STATUS and/or the signal INPUT). In some embodiments, the capture window may be selected in real-time (or near real-time) in response to the detected body position of the driver 152.

The capture device 102 may be configured to capture video image data (e.g., from the lens 112). In some embodiments, the capture device 102 may be a video capturing device such as a camera. In some embodiments, the capture device 102 may be a component of a camera (e.g., a camera pre-installed at a fixed location such as a security camera and/or an in-cabin vehicle camera). The capture device 102 may capture data received through the lens 112 to generate a bitstream (e.g., generate video frames). For example, the capture device 102 may receive light from the lens 112. The lens 112 may be directed, panned, zoomed and/or rotated (e.g., based on the signals CONTROL_A-CONTROL_N) to provide a targeted view from the vehicle 50 and/or provide a targeted view of the driver 152.

The capture device 102 may transform the received light into digital data (e.g., a bitstream). In some embodiments, the capture device 102 may perform an analog to digital conversion. For example, the capture device 102 may perform a photoelectric conversion of the light received by the lens 112. In some embodiments, the capture device 102 may transform the bitstream into video data, a video file and/or video frames (e.g., perform encoding). In some embodiments, no encoding may be performed on the input video (e.g., VIDEO_A-VIDEO_N) before being presented to the display 130 (e.g., encoding and/or subsequent decoding may introduce too much latency). For example, the video data may be a digital video signal. The digital video signal may comprise video frames (e.g., sequential digital images).

The video data of the targeted view from the vehicle 50 and/or the targeted view of the driver 152 may be represented as the signal/bitstream/data VIDEO_A-VIDEO_N (e.g., a digital video signal). The capture devices 102a-102n may present the signals VIDEO_A-VIDEO_N to the processor 106 (or processors 106a'-106n'). The signals VIDEO_A-VIDEO_N may represent the video frames/video data (e.g., the video frames 250 and/or 300). The signals VIDEO_A-VIDEO_N may be a video stream captured by one or more of the capture devices 102a-102n. In some embodiments, the capture device 102 may be implemented in the camera. In some embodiments, the capture device 102 may be configured to add to the existing functionality of the camera (e.g., the lens 112, the capture device 102, the processor 106 and/or other components).

In some embodiments, the capture device 102 may be pre-installed at a pre-determined location and the camera system 100 may connect to the capture device 102. In other embodiments, the capture device 102 may be part of the camera system 100. The capture device 102 may be configured for blind spot monitoring, security monitoring, driver monitoring, driver assistance, insurance purposes, etc. For example, the capture device 102 may be implemented to detect break-ins and/or vandalism. In another example, the capture device 102 may detect accidents to provide evidence for insurance claims.

The capture device 102 may be configured for driver monitoring. For example, the capture device 102 may be implemented to detect drowsiness and/or attentiveness of the driver 152. In another example, the capture device 102 may record the driver 152, (e.g., for use in teleconferencing). The capture device 102 may be configured to recognize the driver 152 through facial recognition. The camera system 100 may be configured to leverage pre-existing functionality of the pre-installed capture device 102. The implementation of the capture device 102 may be varied according to the design criteria of a particular implementation.

The capture device 102 may be configured to detect objects and classify the objects as a particular type of object (e.g., a vehicle, a bicycle, a pedestrian, etc.). The camera system 100 may be configured to leverage pre-existing functionality of the pre-installed capture device 102. The capture device 102 may be configured to perform depth sensing. The implementation of the capture device 102 may be varied according to the design criteria of a particular implementation.

In some embodiments, the capture device 102 may implement the camera sensor 120 and/or the processor 122. The camera sensor 120 may receive light from the lens 112 and transform the light into digital data (e.g., the bitstream). For example, the camera sensor 120 may perform a photoelectric conversion of the light from the lens 112. The processor 122 may transform the bitstream into a human-legible content (e.g., video data). For example, the processor 122 may receive pure (e.g., raw) data from the camera sensor 120 and generate (e.g., encode) video data based on the raw data (e.g., the bitstream). The capture device 102 may have a memory to store the raw data and/or the processed bitstream. For example, the capture device 102 may implement a frame memory and/or buffer to store (e.g., provide temporary storage and/or cache) one or more of the video frames (e.g., the digital video signal). The processor 122 may perform analysis on the video frames stored in the memory/buffer of the capture device 102.

In some embodiments the capture device 102 may be configured to determine a location of the objects detected in the video frame 250 (e.g., the vehicles 302a-302b, the driver 152, the eyes of the driver 254a-254b, the head of the driver 254, etc.). For example, the processor 122 may analyze the captured bitstream (e.g., using machine vision processing), determine a location of the detected objects and present the signals VIDEO_A-VIDEO_N (e.g., comprising information about the location of the detected objects 254) to the processor 106. The processor 122 may be configured to determine the location of the detected objects (e.g., less analysis is performed by the processor 106). In another example, the processor 122 may generate the signals VIDEO_A-VIDEO_N comprising video frames and the processor 106 may analyze the video frames to determine the location of the detected objects (e.g., more analysis is performed by the processor 106). The analysis performed by the processor 122 and/or the processor 106 may be varied according to the design criteria of a particular implementation.

The interfaces 104a-104n may receive data from one or more components of the vehicle 50, the driver 152 and/or other components of the camera system 100 (e.g., the communication device 110). The signal STATUS may be generated in response to the data received from the components of the vehicle 50. In some embodiments, the interface 104a may receive data from the driver 152. The signal INPUT may be generated in response to input from the driver 152. In some embodiments, the interfaces 104a-104n may receive data from the processor 106 (e.g., in response to objects detected by the processor in the signals VIDEO_A-VIDEO_N). The interfaces 104a-104n may send data (e.g., instructions) from the processor 106 to the components of the vehicle 50. For example, the interfaces 104a-104n may be bi-directional.

In the example shown, the data received by the interface 104n may be the status information (e.g., presented to the processor 106 as the signal STATUS). In the example shown, the data received by the interface 104n from the components of the vehicle 50 may be a turn signal indicator, a position of the steering wheel, an angle of the bottom seat cushion, a mirror orientation, a speed of the vehicle, any information available from an on-board diagnostics (OBD) port of the vehicle 50, etc. (e.g., presented to the processor 106 as the signal STATUS). The type of data and/or the number of components of the vehicle 50 that provide data may be varied according to the design criteria of a particular implementation.

In the examples shown (e.g., in FIGS. 1-3), information from the vehicle sensors 114 (e.g., the location module, the orientation module, the temperature module, etc.) may be received by the interfaces 104a-104n. In one example, where the camera system 100 is installed in a vehicle, the interfaces 104a-104n may be implemented as an electronic bus (e.g., a controller area network (CAN) bus) and the sensors 114 may be part of the vehicle. In another example, the interfaces 104a-104n may be implemented as an Ethernet interface. In yet another example, the interfaces 104a-104n may be implemented as an electronic device (e.g., a chip) with a CAN bus controller. In still another example, the interfaces 104a-104n may be provided for human interaction (e.g., buttons, speech detection, etc.). In some embodiments, the sensors 114 may connect directly to the processor 106 (e.g., the processor 106 may implement a CAN bus controller for compatibility, the processor 106 may implement a serial peripheral interface (SPI), the processor 106 may implement another interface, etc.). In some embodiments, the sensors 114 may connect to the memory 108.

The processor 106 may be configured to execute computer readable code and/or process information. The processor 106 may be configured to receive input and/or present output to the memory 108. The processor 106 may be configured to present and/or receive other signals (not shown). The number and/or types of inputs and/or outputs of the processor 106 may be varied according to the design criteria of a particular implementation.

In some embodiments, the processor 106 may receive the signals VIDEO_A-VIDEO_N from the capture devices 102a-102n and detect the objects in the driver monitoring video frame 250 and/or the vehicle perspective video frame 300. In some embodiments, the processors 122a-122n may be configured to detect the objects and the processor 106 may receive the location (or coordinates) of the detected objects in the video frames 250 and/or 300 from the capture devices 102a-102n. In some embodiments, the processor 106 may be configured to analyze the video frames 250 and/or 300 (e.g., the signals VIDEO_A-VIDEO_N). The processor 106 may be configured to detect a location and/or position of the detected objects in the video frames.

Based on the location, position and/or the classification of the detected objects in the video frames 250 and/or 300 (e.g., the signals VIDEO_A-VIDEO_N), the processor 106 may generate a signal (e.g., an input used by the processor 106 to select between one or more available fields of view). The processor 106 may make a decision based on the signals VIDEO_A-VIDEO_N (e.g., whether the driver 152 is attempting to look outside the current FOV displayed on the eMirror 130). The processor 106 may generate the signal VIDEO_OUT in response to the input and/or the decision made in response to the detected objects (e.g., the detected objects, the signal STATUS, the signal INPUT, etc.).

The processor 106 and/or the processors 106a'-106n' may implement an interface (or interfaces) to receive the video signals VIDEO_A-VIDEO_N. In some embodiments, the processors 122a-122n may be configured to distill (e.g., analyze) data in the captured video data. For example, data from the analysis (e.g., the body position of the driver, the environment surrounding the vehicle 50, etc.) may be generated by the processors 122a-122n and presented to the processor 106 (or processors 106a'-106n') as the signals VIDEO_A-VIDEO_N. For example, in the distributed embodiment 100' shown in FIG. 2, the processor 106 may be a separate component (e.g., not part of the same integrated circuit package as the capture devices 102a-102n and/or the lenses 112a-112n). For example, the cameras (e.g., the lenses 112a-112n and/or the capture devices 102a-102n) may be pre-installed cameras and the processor 106 may be installed as an after-market component.

The processor 106 may receive data from the video data captured by the capture devices 102a-102n (e.g., analyzed by the processors 122a-122n), via the interface. The processor 106 may analyze the data received from the signals VIDEO_A-VIDEO_N (e.g., extract the body position of the driver 152 and/or determine a field of view to present to the driver 152 from the video data of the rear facing targeted view). For example, in some embodiments, the signals VIDEO_A-VIDEO_N may carry distilled data (e.g., not necessarily video data). The processor 106 may generate the signal VIDEO_OUT based on the analysis performed.

In some embodiments, one of the processors 106a'-106n' may be a parent processor (e.g., a master processor) and the rest of the processors 106a'-106n' may be child processors (e.g., slave processors). In some embodiments, the processors 122a-122n may be the slave processors and the processor 106 may be the master processor. For example, the slave processors may distill information from the signals VIDEO_A-VIDEO_N. The slave processors may present the results of the analysis to the master processor. Based on the information from the slave processors and/or the status information, the master processor may generate the signal VIDEO_OUT. The configuration of the processors 106a'-106n' may be varied according to the design criteria of a particular implementation.

In some embodiments, the processor 106 may generate the signals CONTROL_A-CONTROL_N in response to the input and/or the decision made in response to the detected objects (e.g., the detected objects, the signal STATUS, the signal INPUT, etc.). The signals CONTROL_A-CONTROL_N may be generated to provide instructions to another one of the processors (e.g., 106a'-106b') and/or another camera (e.g., the capture devices 102a-102n). For example, one or more of the signals CONTROL_A-CONTROL_N may provide instructions to physically move the camera (e.g., zoom in/out, pan, tilt, etc.). In another example, one or more of the signals CONTROL_A-CONTROL_N may provide instructions to digitally adjust the captured video data (e.g., adjust the capture window 350 for the video data, perform a digital pan, zoom and/or tilt, perform a transformation, etc.). The instructions provided by the signals CONTROL_A-CONTROL_N may be varied according to the design criteria of a particular implementation.

The signals CONTROL_A-CONTROL_N may be implemented to provide instructions to the various components of the vehicle 50 and/or the camera system 100. In some embodiments, signals CONTROL_A-CONTROL_N may be presented to the interface 104 and the interface 104 may pass the signals CONTROL_A-CONTROL_N to one of the components of the vehicle 50 and/or the camera system 100. In some embodiments, the signals CONTROL_A-CONTROL_N may be presented directly to one of the components of the vehicle 50 by the processor 106.

The signal VIDEO_OUT may be generated to provide an output for the electronic mirror 130 in response to the captured video frames 250 and/or 300 (e.g., VIDEO_A-VIDEO_N) and/or one or more input signals (e.g., STATUS, INPUT, detected objects, etc.). For example, the input STATUS may be sent to the processor 106 via the interface 104n in order to provide status information (e.g., how far away the head rest 252 is away from the lens 112a). Generally, the signal VIDEO_OUT may correspond to the type of input received by the processor 106.

The transformations performed by the processor 106 may be varied according to the design criteria of a particular implementation. For example, the signal VIDEO_OUT may be processed (e.g., cropped) to fit the shape of the electronic mirror 130 and/or to emulate a reflective view from a conventional reflective mirror (e.g., a side view mirror, a rear view mirror, etc.). For example, the electronic mirror 130 may emulate the reflective view from a conventional reflective mirror as seen from the point of view (or estimated point of view) of the driver 152 by implementing real-time (or near real-time) video streaming of the signal VIDEO_OUT received from the processor 106.

Generally, the signal VIDEO_OUT is some view (or derivative of some view) captured by the capture devices 102a-102n (e.g., the video frames 250 and/or 300). In some embodiments, the signal VIDEO_OUT may provide a series of video frames that improves upon the reflective view from a conventional reflective mirror (e.g., provides night vision, provides more viewing area, highlights detected objects, provides additional data such as a numerical distance of detected objects, etc.). For example, the video frames of the signal VIDEO_OUT may display high dynamic range video to allow for a wide range of luminosity (e.g., where dark areas and bright areas display a greater level of detail and are not completely dark or not completely bright).

The processor 106 and/or the processor 122 may be implemented as an application specific integrated circuit (e.g., ASIC) or a system-on-a-chip (e.g., SOC). The processor 106 and/or the processor 122 may be configured to determine a current size, shape and/or color of the objects. The processor 106 and/or the processor 122 may detect one or more of the detected objects in each video frame. The processor 106 may be configured to compare characteristics of a detected objects in a current video frame to characteristics of the same detected object in previous video frames. In some embodiments, the processor 106 and/or the processor 122 may receive video signals from multiple cameras and/or image sensors (e.g., the capture device 102a-102n).

The processor 106 and/or the processor 122 may determine a number of pixels (e.g., a width, a height and/or a depth) comprising the detected objects in the video frames 250 and/or 300. Based on the number of pixels of each of the detected objects in the video frame 250 and/or 300, the processor 106 and/or the processor 122 may estimate a distance of the objects from the vehicle 50 and/or the distance of the driver 152 from the cameras. Whether the detection of the objects is performed by the processor 106 and/or the processor 122 may be varied according to the design criteria of a particular implementation.

The memory 108 may store data. The memory 108 may be implemented as a cache, flash memory, DRAM memory, etc. The type and/or size of the memory 108 may be varied according to the design criteria of a particular implementation. The data stored in the memory 108 may correspond to the detected objects, reference objects, a video file, status information (e.g., readings from the sensors 114, pre-selected fields of view, user preferences, user inputs, etc.) and/or metadata information.

For example, the memory 108 (e.g., the lookup table 116) may store a reference size (e.g., the number of pixels of a particular object of known size in a video frame at a known distance) of particular objects. In another example, the memory 108 may store a reference shape (e.g., an arrangement of pixels of the reference object in the video frame at a known distance such as the reference objects). In yet another example, the memory 108 may store a reference color (e.g., a RGB value and/or a YCbCr value for each of the pixels of the reference object in the video frames 250 and/or 300) of the detected objects.

The reference size, shape and/or colors stored in the memory 108 may be used to compare the current size of the detected objects in the current video frame 250 and/or 300. The reference size of particular objects stored in the memory 108 may be used to compare the current size of the detected objects in a current video frame. The comparison of the size, shape and/or color of the detected objects in the current video frame and the reference size may be used to determine the location coordinates, rotation and/or movement direction of the objects.

The memory 108 may store the pre-determined location of the camera system 100 and/or a pre-determined field of view of the camera system 100 (e.g., when the camera system 100 is implemented as a fixed view camera). In another example, the memory 108 may store previously captured frames (e.g., a reference image to determine a movement direction of the objects). The type of reference information stored by the memory 108 may be varied according to the design criteria of a particular implementation.

The communication device 110 may send and/or receive data to/from the interfaces 104a-104n. In some embodiments, when the camera system 100 is implemented as a vehicle camera, the communication device 110 may be the OBD of the vehicle. In some embodiments, the communication device 110 may be implemented as a satellite (e.g., a satellite connection to a proprietary system). In one example, the communication device 110 may be a hard-wired data port (e.g., a USB port, a mini-USB port, a USB-C connector, HDMI port, an Ethernet port, a DisplayPort interface, a Lightning port, etc.). In another example, the communication device 110 may be a wireless data interface (e.g., Wi-Fi, Bluetooth, ZigBee, cellular, etc.).

The lenses 112a-112n (e.g., a camera lens) may be directed to provide a targeted view from the vehicle 50 and/or of the environment (e.g., a field of view from the camera sensors 102a-102n and/or an external camera sensor). The lenses 112a-112n may be directed to provide a targeted view of the driver 152 and/or of the vehicle interior (e.g., a field of view from an in-cabin camera). In one example, the lens 112 may be mounted on a rear and/or front dashboard of the vehicle 50. In another example, the lens 112 may be on the side view mirror 130 and/or on a rear end of the vehicle 50. The lens 112 may be aimed to capture environmental data (e.g., light). The lens 112 may be aimed to monitor driver behavior and/or body position. The lens 112 may be configured to capture and/or focus the light for the corresponding capture device 102. Generally, the sensor 120 is located behind the lens 112. Based on the captured light from the lens 112, the capture device 102 may generate a bitstream and/or video data.

The sensors 114 may be configured to determine a location and/or an orientation of the camera system 100. The number and/or types of data used to determine the location and/or orientation of the camera system 100 may be varied according to the design criteria of a particular implementation. In one example, the location module may be used to determine an absolute location of the camera system 100. In another example, the orientation module may be used to determine an orientation of the camera system 100. Other types of sensors may be implemented. The sensors 114 may be used to determine a relative position of the vehicle 50 with respect to the vehicles 302a-302b.

Data from the sensors 114 may be presented to the processor 106 as the signal STATUS. The number and/or types of the sensors 114 may be varied according to the design criteria of a particular implementation. The sensors 114 may be used by the camera system 100 to determine a movement direction of the vehicle 50 (e.g., using information from turn signals of the vehicle 50 being activated and/or a movement direction and amount of movement of a steering wheel of the vehicle 50).

The sensors 114 (e.g., the location module, the orientation module and/or the other types of sensors) may be configured to determine an absolute location and/or an azimuth orientation of the camera system 100. The absolute location and/or the azimuth orientation of the camera system 100 may be added to the relative location of the detected objects to determine an absolute location (e.g., coordinates) of the objects. The absolute location of the vehicle 50 and/or the absolute location of the objects may be used to determine a body position (e.g., head position, face location) and/or gaze direction of the driver 152.

The signal STATUS may provide information for the camera system 100 (e.g., the status information). In one example, location information may be determined by the location module (e.g., to determine weather conditions and/or road conditions for the current location of the vehicle 50). For example, the location module may be implemented as a GPS sensor. Orientation information may be determined by the orientation module. For example, the orientation module may be implemented as a magnetometer, an accelerometer and/or a gyroscope. In yet another example, temperature information may be determined by the temperature module. For example, the temperature module may be implemented as a thermometer.

The types of sensors used to implement the location module, the orientation module, the temperature module and/or any other types of sensors may be varied according to the design criteria of a particular implementation. In some embodiments, the signal STATUS may provide details about the camera system 100 (e.g., camera specifications, camera identity, the field of view 204, date, time, etc.).

Figure 9:
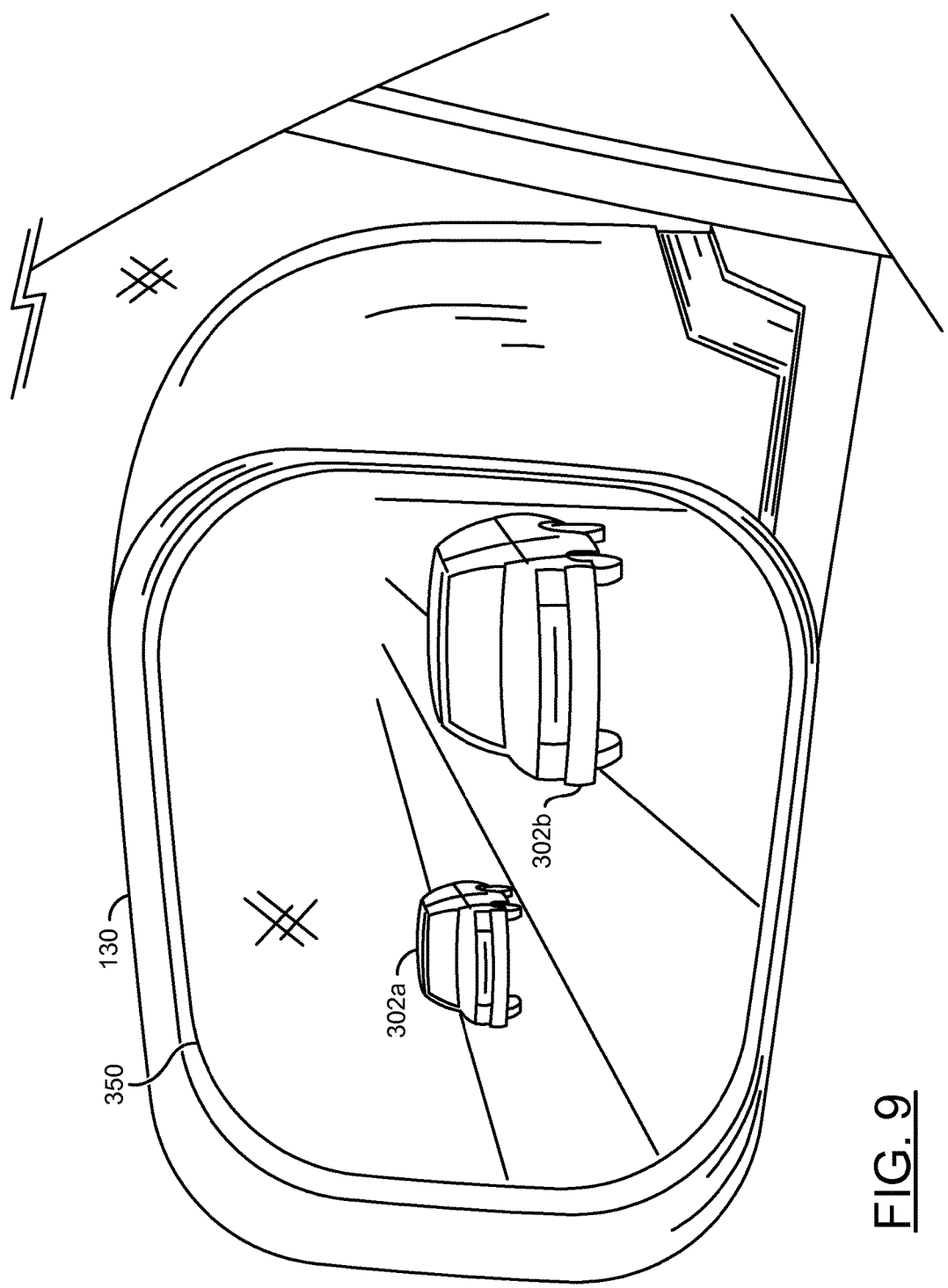
FIG. 9 is a diagram illustrating the electronic mirror displaying a field of view.

Referring to FIG. 9, a diagram illustrating the electronic mirror 130 displaying a field of view 350 is shown. For example, the field of view 350 may be the wide angle field of view FOVA_W (or FOVB_W). In some embodiments, the FOV 350 may be the capture window 350 shown in FIG. 8. In some embodiments, the FOV 350 may be displayed in response to a camera being physically moved (e.g., the FOV is adjusted based on a physical movement of the camera and the capture window is the same resolution of the video input frame). The electronic mirror 130 is shown presenting the FOV 350 that includes the vehicle 302a and the vehicle 302b. The FOV 350 may be one example frame of a series of video frames. The FOV 350 may be a portion of the captured video frame 300 (e.g., the capture window 350). For example, the FOV 350 may be a version of the captured video frame 300 cropped by the processor 106. In the example shown, the portion of the vehicle 50 shown in the video frame 300 has been cropped out of the video frame 300 to provide the FOV 350.

In some embodiments, the FOV 350 may be a default view for the eMirror 130. For example, the FOV 350 may provide a suitable amount of the surrounding the environment of the vehicle 50 for a majority of driving situations. For example, the FOV 350 may be displayed by the eMirror 130 when the driver 152 is driving and looking forwards (e.g., normal driving). In some embodiments, the default view may be selected based on the type of driving detected (e.g., based on the signal STATUS and/or based on video analysis performed by the processor 106 on the video data from the targeted view from the perspective of the vehicle 50). For example, the FOV 350 may vary depending on whether the vehicle 50 is turning, backing up (e.g., traveling in reverse), driving on city streets, driving off-road, driving on highways, driving at particular speeds and/or speed ranges, etc. For example, the FOV 350 may be displayed based on information received from the signal STATUS and/or other information. However, when attempting to turn, change lanes, check the surroundings of the vehicle 50, the driver may attempt to look outside of the FOV 350. A traditional reflective mirror may reflect a different image when the driver 152 moves. Similarly, the processor 106 may adjust the FOV displayed on the eMirror 130 when the driver 152 moves.

Figure 10:
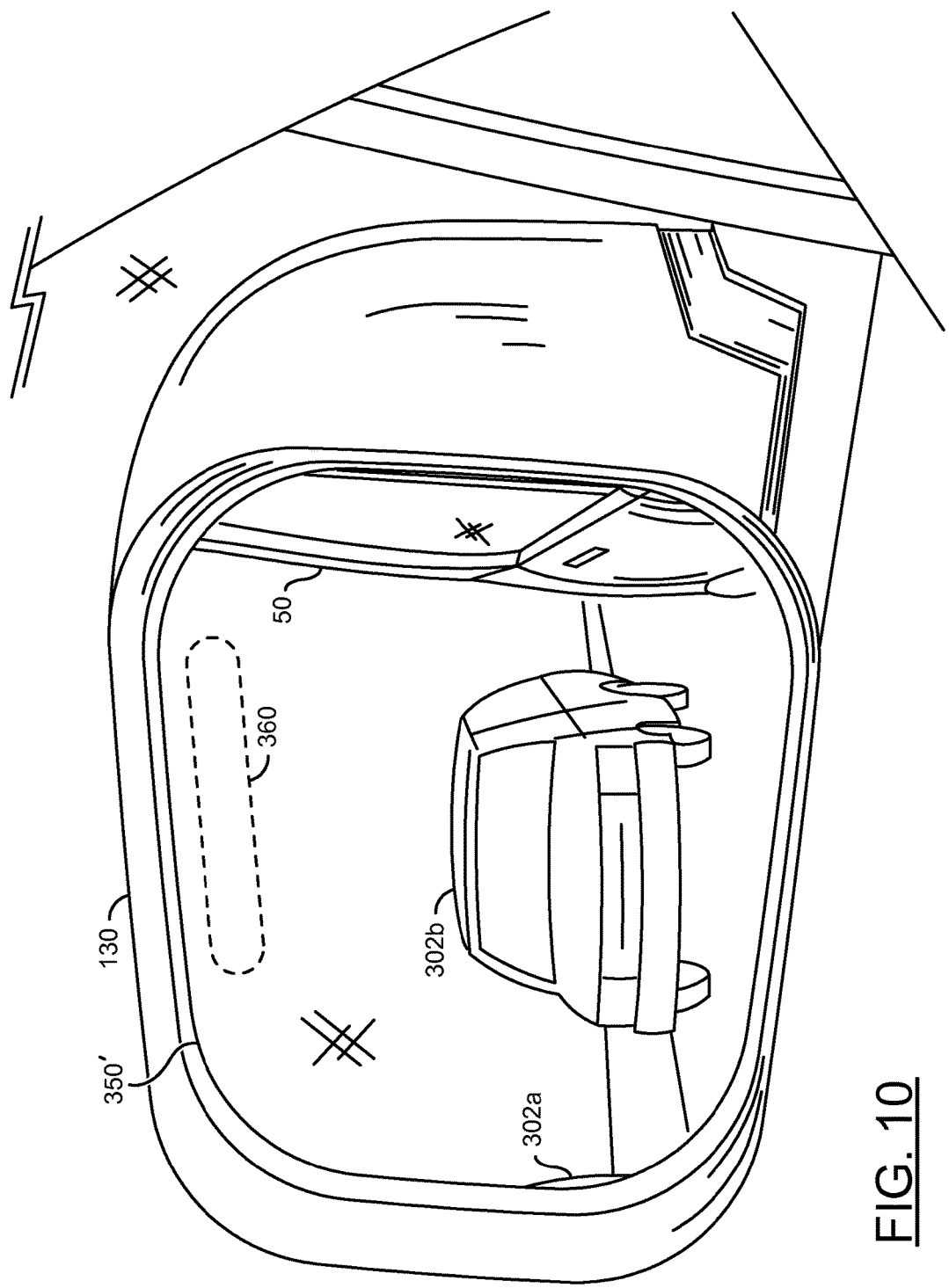
FIG. 10 is a diagram illustrating the electronic mirror displaying an alternate field of view in response to a body position of the driver.

Referring to FIG. 10, a diagram illustrating the electronic mirror 130 displaying an alternate field of view 350' in response to a body position of the driver 152 is shown. For example, the field of view 350' may be the narrow angle field of view FOVA_N (or FOVB_N). In some embodiments, the FOV 350' may be the capture window 350' shown in FIG. 8. In some embodiments, the FOV 350' may be displayed in response to a camera being physically moved (e.g., the FOV is adjusted based on a physical movement of the camera and the capture window is the same resolution of the video input frame). The electronic mirror 130 is shown presenting the FOV 350' that includes the portion of the vehicle 50, vehicle 302b and a small portion of the vehicle 302a. The FOV 350' may be one example frame of a series of video frames. The FOV 350' may be a portion of the captured video frame 300 cropped by the processor 106 (e.g., the capture window 350'). In the example shown, most of the vehicle 302a has been cropped out of the video frame 300 to provide the FOV 350'.

In some embodiments, the FOV 350' may be a field of view displayed on the eMirror 130 in response to the driver 152 changing body position (e.g., body movement and/or head movement as shown in FIG. 7). For example, the FOV 350' may provide a view of the vehicle 50 to allow the driver 152 to check a blind spot and/or gauge a distance between the vehicle 50 and other traffic relative to the side of the vehicle 50. For example, the FOV 350' may be displayed by the eMirror 130 when the driver 152 is leaning over and/or performing a head movement (e.g., rotation, leaning forward, eye movements, etc.).

The FOV 350' may provide better safety (e.g., allow the driver 152 to more accurately judge distance between vehicles on the road). For example, the driver 152 may peek at the eMirror 130 and see the FOV 350 displayed. The FOV 350 may not provide enough information to allow the driver 152 to safely perform a lane change. The driver 152 may attempt to look outside of the FOV 350 (e.g., change body position). The processor 106 may detect the change in body position of the driver and determine the field of view to display on the eMirror 130 (e.g., the FOV 350'). The FOV 350' may provide enough information to allow the driver 152 to safely perform a lane change. After completing the lane change, the driver 152 may look away from the eMirror 130. The processor 106 may determine that the driver 152 should no longer see the FOV 350'. The processor 106 may update the display to show the FOV 350 (or another suitable FOV based on the body position and/or gaze of the driver 152).

The FOV 350' may be supplemented with a notification 360. The notification 360 may be a visual cue. The notification 360 may be implemented to display information about the FOV displayed on the eMirror 130. In some embodiments, the notification 360 may be implemented to provide the driver 152 with some visual indication that the FOV 350 has been changed to the FOV 350'. For example, the notification 360 may be implemented as a colored border and/or an overlay (e.g., a subtle, non-intrusive overlay) displayed on the eMirror 130. In another example, the notification 360 may be implemented as a signal light blinking on the edge of the eMirror 130 (e.g., similar to turn signals implemented on reflective mirrors on some makes/models of vehicles).

In some embodiments, the notification 360 may be activated in response to the status information (e.g., the signal STATUS indicating that a turn signal of the vehicle 50 has been activated). In some embodiments, the notification 360 may be implemented as a temporary visual cue. In some embodiments, the notification 360 may be implemented as a persistent visual cue (e.g., the notification 360 may continually and/or periodically display information about the FOV being displayed). The camera system 100 may monitor a current status of the FOV displayed on the eMirror 130 and store the current status of the FOV in the memory 108. For example, the notification 360 may display the current status of the FOV on the eMirror 130. For example, the notification 360 may be a status bar and/or a semi-transparent overlaid graphical icon. In one example, the graphical icon notification 360 may display a graphical cone shape with widening and narrowing edges to correspond to the widening and narrowing of the FOV displayed (e.g., to indicate how much of the FOV is being shown at a particular instance).

The notification 360 may also provide a zoom level indicator. For example, the notification 360 may be a graphical icon displaying boxes to indicate zoom level. In one example, the graphical icon notification 360 may display boxes inside boxes and no zoom may be indicated by the boxes converging. In another example, the graphical notification 360 may display boxes inside boxes and a zoom may be indicated when a smaller box moves inside a bigger box. In yet another example, the notification 360 may indicate a zoom level using a numerical indicator (e.g., 1×, 2×, 5×, 10×, 90°, 60°, etc.). The implementation of the notification 360 may be varied according to the design criteria of a particular implementation.

In some embodiments, the notification 360 may be implemented using auditory cues. For example, the notification 360 may be implemented as a subtle tone, beep and/or message. In some embodiments, the notification 360 may be implemented as tactile cues. For example, the notification 360 may be implemented by a gentle vibration under a steering wheel of the vehicle 50. In one example, when the left side eMirror 130a adjusts to display an expanded FOV, the notification 360 may be one or more long duration vibrations of the steering wheel under a left hand of the driver 152. In another example, when both side eMirrors 130a-130b adjusts to display a reduced FOV, the notification 360 may be one or more short duration vibrations of the steering wheel under both hands of the driver 152. The auditory and/or tactile cues may be implemented by the processor 106 sending one or more signals via the interfaces 104a-104n. The implementation of the auditory and/or tactile cues may be varied according to the design criteria of a particular implementation.

Figure 11:
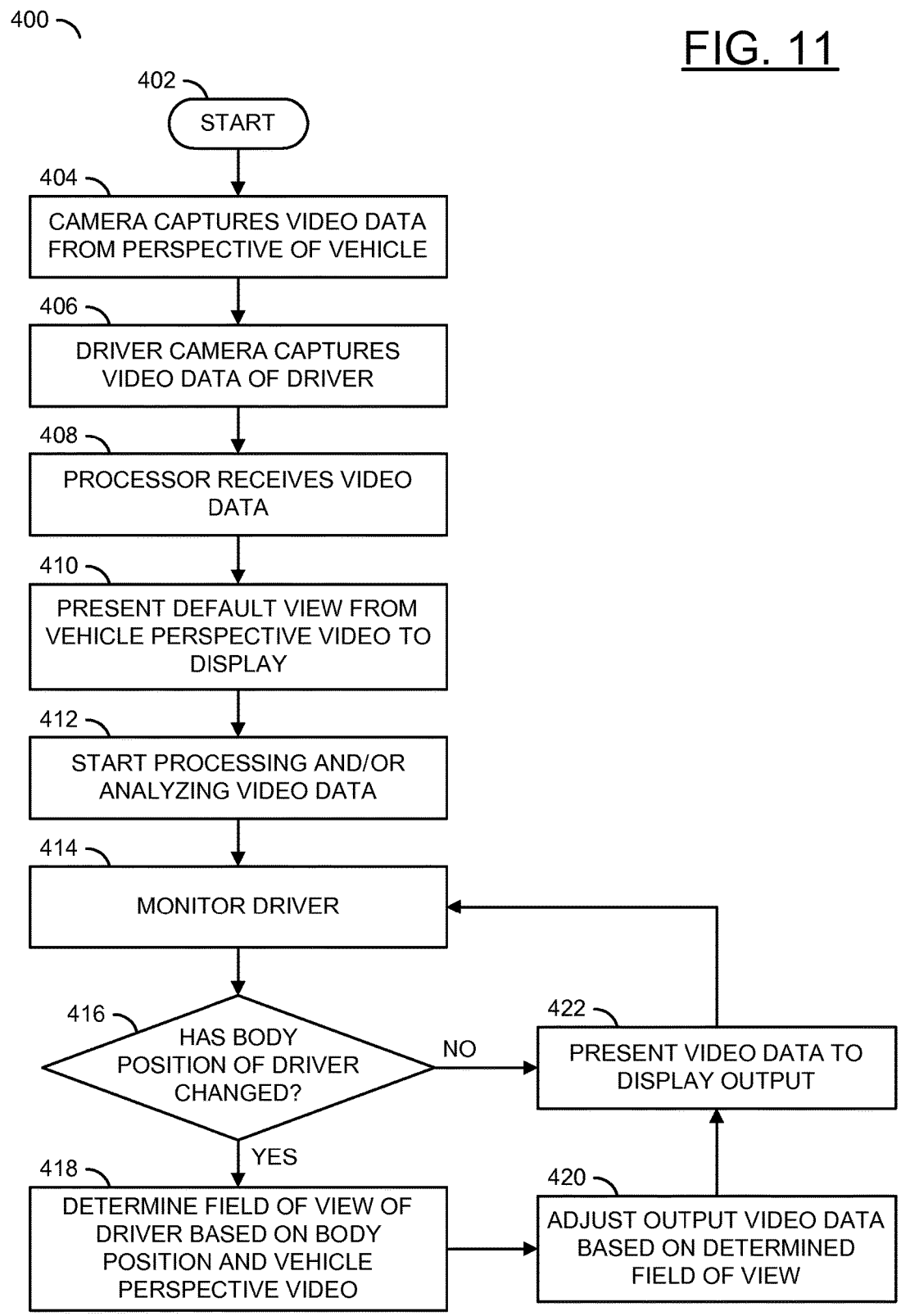
FIG. 11 is a flow diagram illustrating a method for adjusting the field of view displayed on an electronic mirror using real-time physical cues from the driver.

Referring to FIG. 11, a method (or process) 400 is shown. The method 400 may adjust the field of view displayed on an electronic mirror 130 using real-time physical cues from the driver 152. The method 400 generally comprises a step (or state) 402, a step (or state) 404, a step (or state) 406, a step (or state) 408, a step (or state) 410, a step (or state) 412, a step (or state) 414, a decision step (or state) 416, a step (or state) 418, a step (or state) 420, and a step (or state) 422.

The state 402 may start the method 402. In the state 404, the camera (e.g., the lens 112n, the capture device 102n and/or the processor 106n) may capture video data from the perspective of the vehicle 50 (e.g., the signal VIDEO_N represented by the video frame 300 in FIG. 8). In the state 406, the camera (e.g., the lens 112a, the capture device 102a and/or the processor 106a) may capture video data of the driver 152 (e.g., the signal VIDEO_N represented by the video frame 250 in FIGS. 6-7). In the state 408, the processor 106 may receive the video data (e.g., VIDEO_A-VIDEO_N from at least two cameras).

In the state 410, the processor 106 may present a default view from the perspective of the vehicle 50 to the display 130. For example, the default view may be an initial view that does not necessarily take into account the body position of the driver 152. The default view may provide a FOV that is typical for a driver sitting upright while driving (e.g., not leaning over or rotating their head). In the state 412, the processor 106 may start processing and/or analyzing the video data (e.g., aggregated video data from the signals VIDEO_A-VIDEO_N). In the state 414, the processor 106 may monitor the driver 152 (e.g., using data extracted from the video signal VIDEO_A). Next, the method 400 may move to the decision state 416.

In the decision state 416, the processor 106 may determine if the body position of the driver 152 has changed. If the body position of the driver 152 has changed, the method 400 may move to the state 418. In the state 418, the processor 106 may determine the FOV to output to the display 130 based on the body position of the driver 152, and the video data that provides the perspective from the vehicle 50 (e.g., the signal VIDEO_N). In the state 420, the processor 106 may adjust the signal VIDEO_OUT based on the determined FOV. Next, the method 400 may move to the state 422. If the body position of the driver 152 has not changed, the method 400 may move to the state 422. In the state 422, the processor 106 may present the video data VIDEO_OUT to the display 130. Next, the method 400 may return to the state 414.

Figure 12:
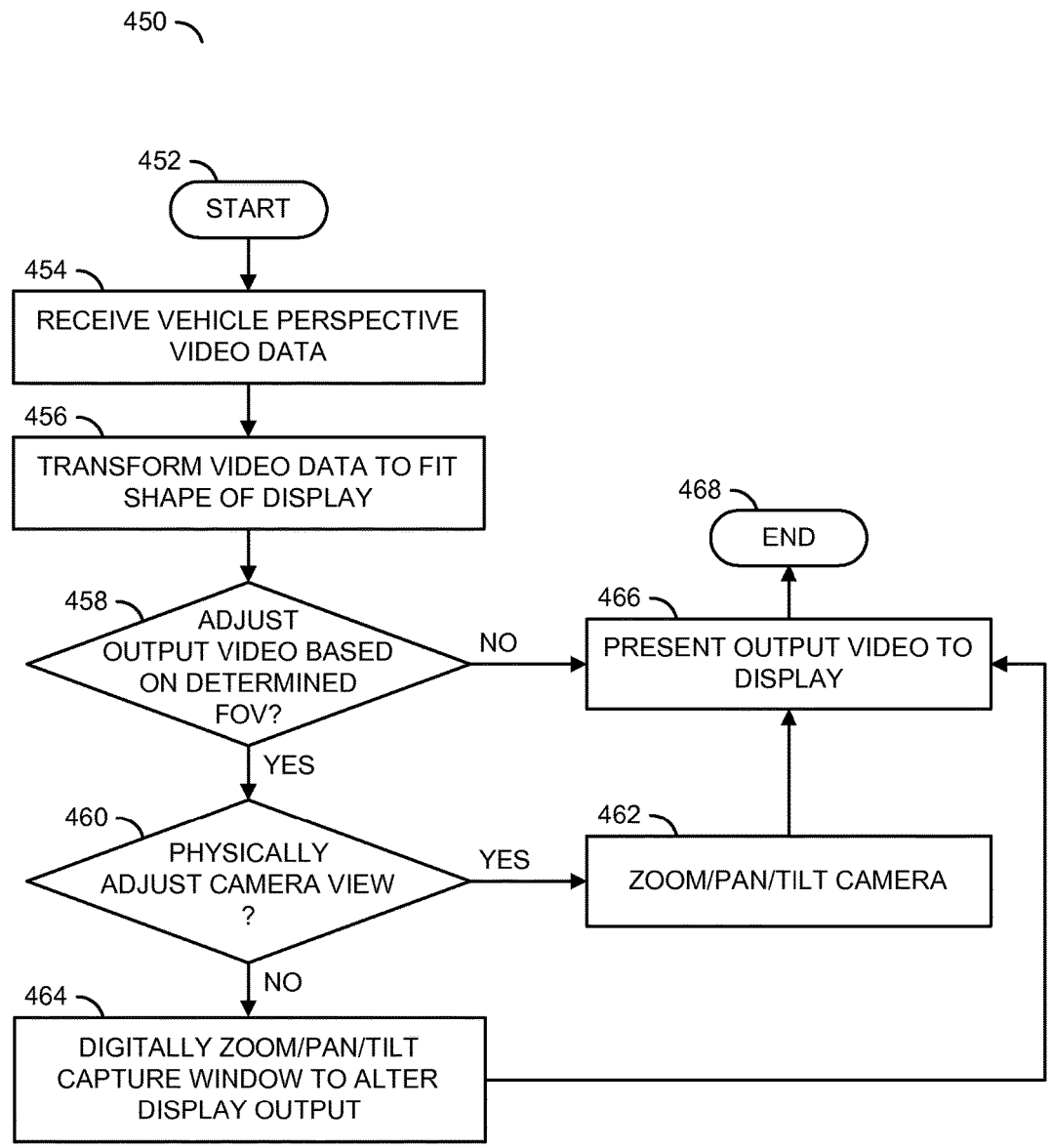
FIG. 12 is a flow diagram illustrating a method for physically and/or digitally adjusting the captured field of view.

Referring to FIG. 12, a method (or process) 450 is shown. The method 450 may physically and/or digitally adjust the captured field of view. The method 450 generally comprises a step (or state) 452, a step (or state) 454, a step (or state) 456, a decision step (or state) 458, a decision step (or state) 460, a step (or state) 462, a step (or state) 464, a step (or state) 466, and a step (or state) 468.

The state 452 may start the method 450. In the state 454, the processor 106 may receive the vehicle perspective video data (e.g., the signal VIDEO_N represented by the video frame 300 in FIG. 8). In the state 456, the processor 106 may transform the video data to fit the shape of the display 130 and/or improve video quality. Next, the method 450 may move to the decision state 458. In the decision state 458, the processor 106 may determine whether to adjust the output video (e.g., the signal VIDEO_OUT represented by the video frame 350 in FIG. 9) based on the determined FOV. If the decision state 458 determines not to adjust the output video based on the determined FOV, the method 450 may move to the state 466. If the decision state 458 determines to adjust the output video based on the determined FOV, the method 450 may move to the decision state 460.

In the decision state 460, the processor 106 may determine whether to physically adjust the camera (e.g., based on whether the current captured video frame 300 can be adjusted to provide a suitable FOV to the driver 152). If the decision state 460 determines to physically adjust the camera view, the method 450 may move to the state 462. In the state 462, the processor 106 may send the signals CONTROL_A-CONTROL_N to zoom/pan/tilt the camera (e.g., the lens 112n, the capture device 102n and/or the processor 106n). Next, the method 450 may move to the state 466.

If the decision state 460 determines not to physically adjust the camera view, the method 450 may move to the state 464. In the state 464, the processor 106 may digitally zoom/pan/tilt the capture window 350 to alter the display output (e.g., move the capture window 350 to crop the video frame 300 to show the video frame 350' shown in FIG. 10). For example, the processor 106 may digitally zoom the capture window 350 by reducing the FOV by considering a subset of the current capture window (e.g., view) and interpolating pixels to upscale to the initial resolution displayed (e.g., the resolution of the eMirror 130). Next, the method 450 may move to the state 466. In the state 466, the processor 106 may present the output video (e.g., VIDEO_OUT) to the display 130. Next, the method 450 may move to the state 468. The state 468 may end the method 450.

There may be various transformations performed on the input video signals (e.g., VIDEO_A-VIDEO_N). The transformations may be implemented to allow the video output to be elegantly displayed on the display 130. For example, the video may be scaled (e.g., the input video may have a different (e.g., higher) resolution than the output video). In another example, the video may be dewarped to accommodate the shape of the display device 130. In yet another example, the video may be dewarped to remove visual artifacts introduced by the lens 112. In still another example, the video may be cropped to a region (e.g., a subset and/or capture window 350) of the input video. The type of transformations performed may be varied according to the design criteria of a particular implementation.

Figure 13:
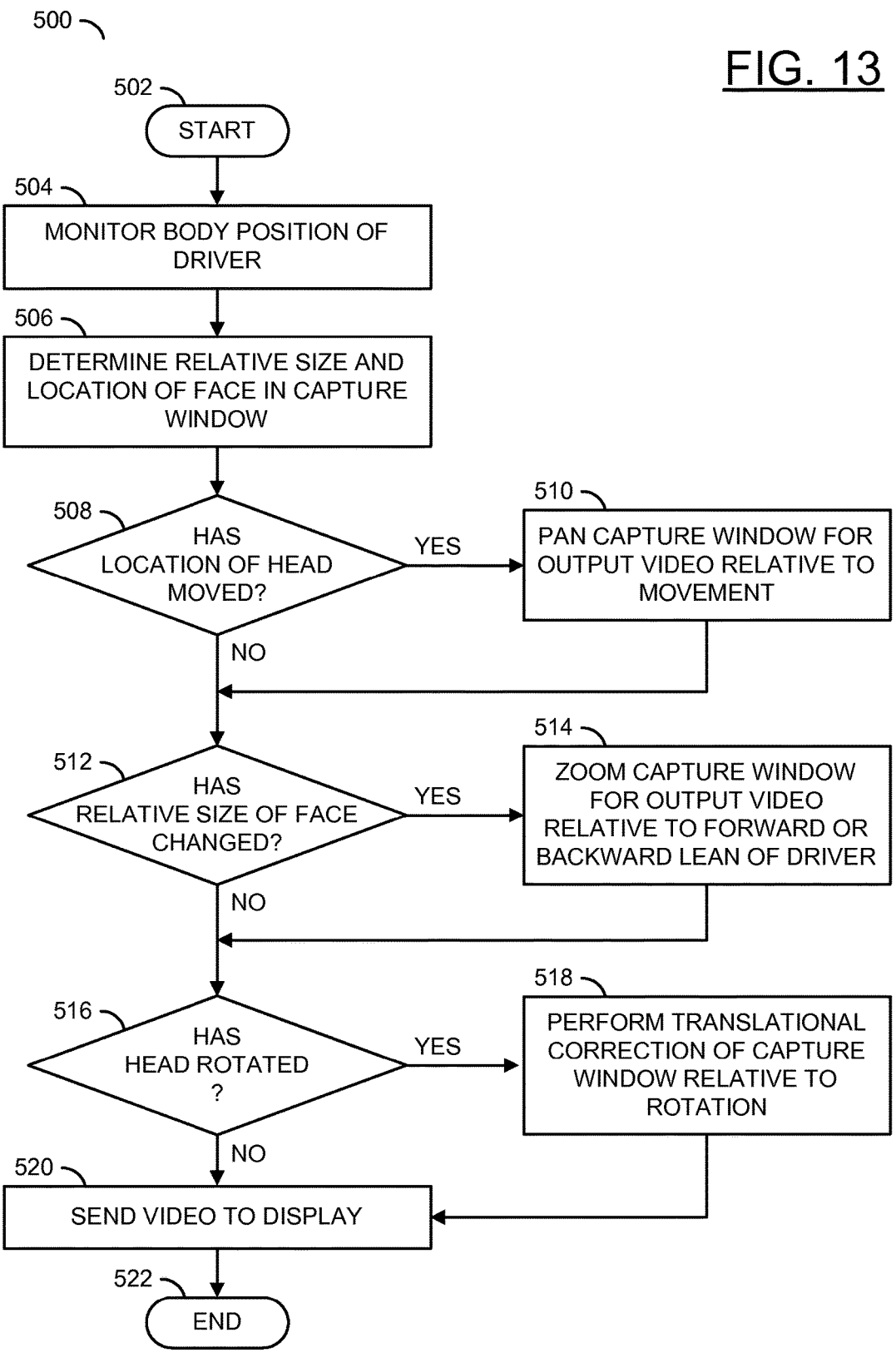
FIG. 13 is a flow diagram illustrating a method for monitoring the driver.

Referring to FIG. 13, a method (or process) 500 is shown. The method 500 may monitor the driver. The method 500 generally comprises a step (or state) 502, a step (or state) 504, a step (or state) 506, a decision step (or state) 508, a step (or state) 510, a decision step (or state) 512, a step (or state) 514, a decision step (or state) 516, a step (or state) 518, a step (or state) 520, and a step (or state) 522.

The state 502 may start the method 500. In the state 504, the processor 106 may monitor the body position of the driver 152 (e.g., by extracting data from the signal VIDEO_A represented by the video frame 250 in FIGS. 6-7). In the state 506, the processor 106 may determine a relative size and/or location of the face of the driver 152 in the capture window. Next, the method 500 may move to the decision state 508.

In the decision state 508, the processor 106 may determine whether the location of the head of the driver 152 has moved. If the decision state 508 has determined the head has moved, the method 500 may move to the state 510. In the state 510, the processor 106 may pan the capture window (e.g., move the capture window location 350 to the capture window location 350') to generate the output video (e.g., VIDEO_OUT) relative to the detected movement. Next, the method 500 may move to the decision state 512. If the decision state 512 has determined the head has not moved, the method 500 may move to the decision state 512.

In the decision state 512, the processor 106 may determine whether a relative size of the face of the driver 152 has changed. If the decision state 512 determines the relative size of the face of the driver 152 has changed, the method 500 may move to the state 514. In the state 514, the processor 106 may zoom the capture window 350 for the output video VIDEO_OUT relative to the forward or backward lean of the driver 152. Next, the method 500 may move to the decision state 516. If the decision state 512 determines the relative size of the face of the driver 152 has not changed, the method 500 may move to the decision state 516.

In the decision state 516, the processor 106 may determine whether the head of the driver 152 has rotated. If the decision state 516 determines the head of the driver 152 has rotated, the method 500 may move to the state 518. In the state 518, the processor 106 may perform a translational correction of the capture window 350 relative to the rotation detected. Next, the method 500 may move to the state 520. If the decision state 516 determines the head of the driver 152 has not rotated, the method 500 may move to the state 520.

In the state 520, the processor 106 may send the output video VIDEO_OUT to the display 130. Next, the method 500 may move to the state 522. The state 522 may end the method 500.

Figure 14:
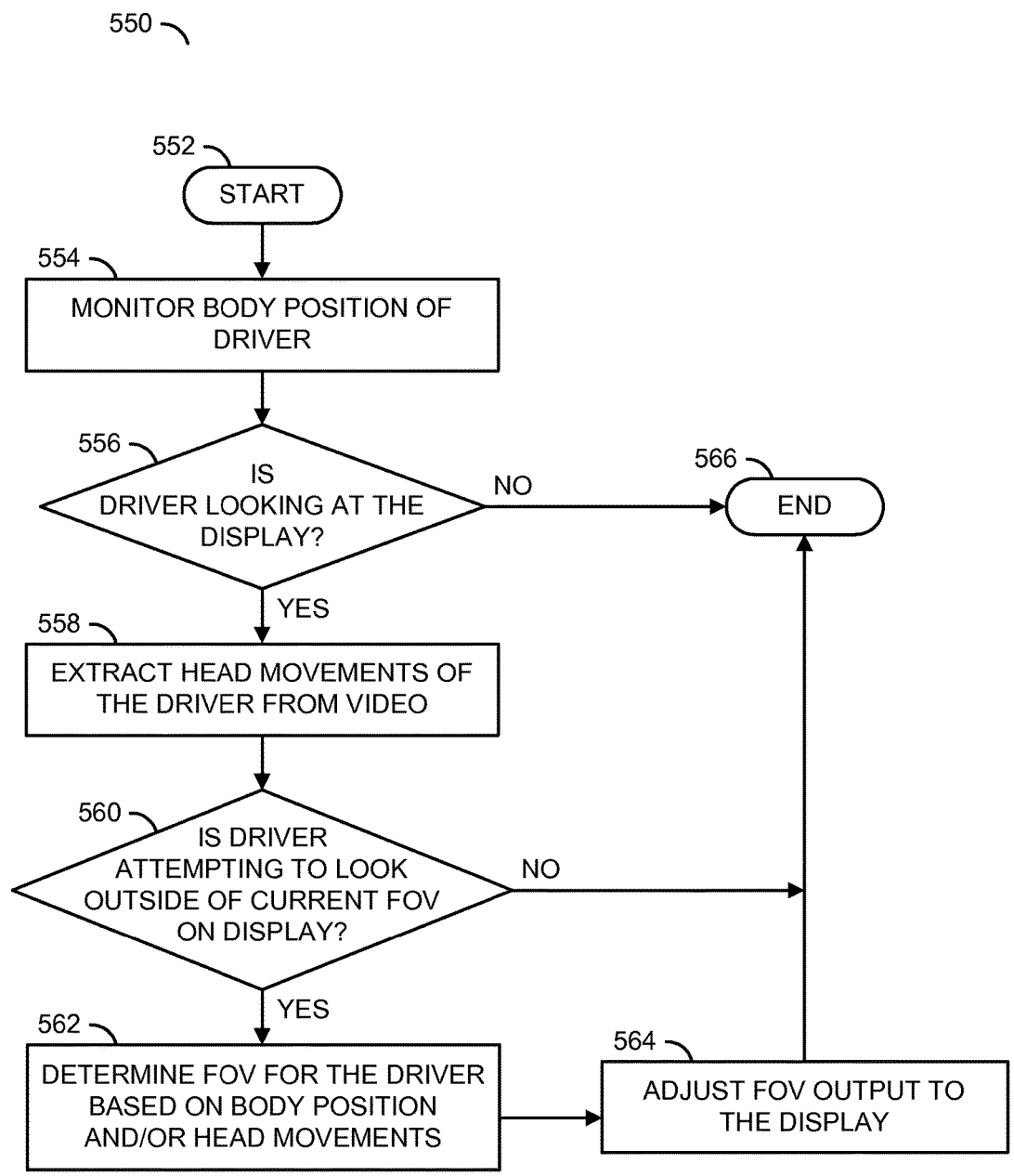
FIG. 14 is a flow diagram illustrating a method for determining whether the driver is attempting to look outside a current field of view on a display.

Referring to FIG. 14, a method (or process) 550 is shown. The method 550 may determine whether the driver is attempting to look outside a current field of view on a display. The method 550 generally comprises a step (or state) 552, a step (or state) 554, a decision step (or state) 556, a step (or state) 558, a decision step (or state) 560, a step (or state) 562, a step (or state) 564, and a step (or state) 566.

The state 552 may start the method 550. In the state 550, the processor 106 may monitor the body position of the driver 152 (e.g., by extracting data from the signal VIDEO_A represented by the video frame 250 in FIGS. 6-7). Next, the method 550 may move to the decision state 556. In the decision state 556, the processor 106 may determine whether the driver is looking at the display 130 (e.g., based on data extracted from the video frame 250).

If the decision state 556 determines the driver 152 is not looking at the display 130, the method 550 may move to the state 566. If the decision state 556 determines the driver 152 is looking at the display 130, the method 550 may move to the state 558. Next, the method 550 may move to the decision state 560. In the decision state 560, the processor 106 may determine whether the driver 152 is attempting to look outside of a current FOV shown on the display 130 (e.g., based on data extracted from the video frame 250, such as the gaze 256a-256b).

If the decision state 560 determines the driver 152 is not attempting to look outside of the current FOV shown on the display 130, the method 550 may move to the state 566. If the decision state 560 determines the driver 152 is attempting to look outside of the current FOV shown on the display 130, the method 550 may move to the state 562.

In the state 562, the processor 106 may determine the FOV to present to the driver 152 based on the body position and/or head movements of the driver 152. In the state 564, the processor 106 may adjust the FOV output to the display 130. Next, the method 550 may move to the state 566. The state 566 may end the method 550.

The camera system 100 may implement a camera (e.g., the lens 112a, the capture device 102a and/or the processor 106a) that is mounted on and/or near the e-mirror display 130. The camera 112a may actively monitor the driver 152. The camera may be mounted in-cabin (e.g., inside the vehicle 50). The camera system 100 may use the camera to capture a video signal (e.g., the signal VIDEO_A). The processor 106 may be configured to detect the head, face and/or gaze (e.g., body position) of the driver 152 by analyzing the input signal (e.g., VIDEO_A). When the gaze of the driver 152 is detected to be directed towards the e-mirror display 130, the head movements of the driver 152 may be monitored.

The monitoring by the processor 106 may determine whether the driver 152 is attempting to look outside the FOV displayed on the e-mirror 130. If the head of the driver 152 shifts in a direction that indicates the driver is attempting to look outside the current FOV of the rear viewing camera system (e.g., the lens 112n, the capture device 102n and/or the processor 106n) the FOV of the rear facing camera may be adjusted. The camera system 100 may be configured to adjust the FOV to mimic (or emulate), as close as possible, the effect on FOV when the driver 152 is viewing a traditional rear facing reflective mirror. For example, similar adjustments may be made to the FOV displayed on the e-mirror 130 as would be reflected when using a traditional reflective mirror.

The camera system 100 may be configured to adjust the FOV to provide improvements over a traditional rear facing reflective mirror. For example, when the driver 152 leans forward, the camera system 100 may amplify a zoom level in a pre-configured manner for the video output on the eMirror 130. The notification 360 may be updated in real-time (or near real-time) along with the zoom level. For example, when the driver 152 leans forward, the zoom level increases, the FOV 350 decreases and the notification 360 is updated and displayed (e.g., the notification 360 is changed from 1× zoom to 2× zoom).

The FOV of the e-mirror 130 may be modified by one or a combination of a variety of mechanisms. In some embodiments, the camera system 100 may be mounted using a system that allows the rear-facing camera to rotate horizontally and/or vertically to alter the direction of view in relation to the movement of the head of the driver 152. In some embodiments, the camera system 100 may capture a very wide field of view from the rear-facing camera. The processor 106 (or one of the processors 122a-122n) may be configured to horizontally and/or vertically transform (e.g., dewarp) the captured video (e.g., to fit the display 130). The transformed representation of a subset and/or window of the captured video may be displayed on the e-mirror display 130. For example, the camera system 100 may display a dewarped subset of the field of view to more accurately represent the scene as the scene would traditionally appear in an optical/reflective mirror system. The processor 106 may be configured to digitally pan and/or tilt over the capture window 350 to alter the displayed FOV presented to the driver 152.

In some embodiments, the processor 106 may have dual and/or multiple video inputs (e.g., configured to receive each of VIDEO_A-VIDEO_N). For example, one processor 106 may process the video incoming from the driver facing camera 102a, distill the information from the video feed and use the information to manipulate the video capture device for the second camera 102n (e.g., using the signal CONTROL_N). In some embodiments, one system (e.g., the lens 112a, the capture device 102a and/or the processor 106a') may pass the distilled visual cues to the second processor 106n' via the signal CONTROL_AN. In some embodiments, one system (e.g., the lens 112a, the capture device 102a and/or the processor 106a') may pass higher level directives on how to modify the physical position, digital capture window 350 and/or digital video output (e.g., digital pan tilt) of the second system (e.g., the lens 112n, the capture device 102n and/or the processor 106n') via the signal CONTROL_N. The configuration of the cameras and/or the number of processors implemented may be varied according to the design criteria of a particular implementation.

The functions performed by the diagrams of FIGS. 11-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a first sensor configured to generate a first video signal based on a targeted view from a vehicle;
a second sensor configured to generate a second video signal based on a targeted view of a driver; and
a processor configured to (A) receive said first video signal, (B) receive said second video signal, (C) determine a field of view to present to said driver, (D) generate a third video signal and (E) present said third video signal to an electronic mirror configured to show said field of view, wherein (a) said field of view is determined based on (i) a body position of said driver extracted from said second video signal by determining a distance from said second sensor and (ii) said first video signal, (b) said distance from said second sensor is based on a comparison of a number of pixels of a known object in a first video frame showing an interior of said vehicle without said driver and a second video frame of said interior of said vehicle with said driver, (c) said field of view displayed on said electronic mirror is configured to emulate a view from a reflective mirror as seen from a point of view of said driver and (d) said electronic mirror implements at least one of a rear view mirror and a side view mirror for said vehicle.

2. The apparatus according to claim 1, wherein said body position of said driver is extracted from said second video signal by said processor using video analytics based on machine learning.

3. The apparatus according to claim 1, wherein said first sensor is configured to capture video data from a perspective of said vehicle.

4. The apparatus according to claim 3, wherein said perspective of said vehicle is a view directed to the rear of said vehicle.

5. The apparatus according to claim 1, wherein said second sensor is implemented using an in-cabin camera.

6. The apparatus according to claim 1, wherein said second sensor is configured to monitor said driver by detecting at least one of a head, face and gaze of said driver.

7. The apparatus according to claim 6, wherein said monitoring of said driver is performed using data from said second sensor and one or more other sensors directed at said driver.

8. The apparatus according to claim 1, wherein said processor is configured to (i) determine whether said driver is attempting to look outside a current field of view output to said electronic mirror and (ii) adjust said field of view output to said electronic mirror, if said processor determines said driver is attempting to look outside said current field of view output to said electronic mirror.

9. The apparatus according to claim 1, wherein (i) said first sensor is implemented as part of a camera and (ii) said processor is configured to cause said camera to alter a direction of view of said camera based on said field of view of said driver.

10. The apparatus according to claim 1, wherein (i) said first sensor is configured to capture a wide field of view, (ii) said processor is configured to transform said first video signal to fit said electronic mirror and (iii) said third video signal is a subset of said transformed first video signal.

11. The apparatus according to claim 10, wherein said processor is configured to adjust said field of view by performing at least one of a digital pan, a digital tilt and a digital zoom of said transformed first video signal.

12. The apparatus according to claim 10, wherein said transform comprises at least one of scaling, dewarping, removing visual artifacts, and cropping.

13. The apparatus according to claim 1, wherein (A) said body position of said driver is further determined based on an analysis of one or more video frames from one or more other in-cabin cameras capturing said driver, and (B) said analysis determines (a) a location of the head of said driver, (b) a relative size of the head of said driver and (c) a rotation of the head of said driver.

14. The apparatus according to claim 1, wherein said field of view displayed on said electronic mirror is configured to improve upon a view from a reflective mirror by implementing at least one of (i) amplifying a zoom level of said field of view in response to said body position of said driver, (ii) showing a high dynamic range (HDR) of luminosity, (iii) providing night vision, (iv) providing more viewing area and (v) highlighting detected objects.

15. The apparatus according to claim 1, wherein a notification is generated to indicate information about said field of view currently shown on said electronic mirror.

16. The apparatus according to claim 1, wherein said apparatus implements adjusting said field of view displayed on said electronic mirror using real-time physical cues from said driver in said vehicle.

17. The apparatus according to claim 1, wherein (i) said first sensor is implemented in a first enclosure, (ii) and said second sensor is implemented in a second enclosure and (iii) said processor is implemented in either said first enclosure or said second enclosure.

18. An apparatus comprising:
- an interface configured to receive (i) data from a first video signal based on a targeted view from a vehicle captured by a first sensor and (ii) data from a second video signal based on a targeted view of a driver captured by a second sensor; and
- a processor configured to (A) determine a field of view to present to said driver, (B) generate a third video signal and (C) present said third video signal to an electronic mirror configured to show said field of view, wherein (a) said field of view is determined based on (i) a body position of said driver extracted from said second video signal by determining a distance of said driver from said second sensor and (ii) said data from said first video signal, (b) said distance from said second sensor is based on a comparison of a number of pixels of a known object in a first video frame showing an interior of said vehicle without said driver and a second video frame of said interior of said vehicle with said driver, (c) said field of view displayed on said electronic mirror is configured to emulate a view from a reflective mirror as seen from a point of view of said driver and (d) said electronic mirror implements at least one of a rear view mirror and a side view mirror for said vehicle.

19. The apparatus according to claim 1, wherein (i) said distance is determined based on video analysis by said processor to determine location coordinates for eyes of said driver, (ii) said video analysis is used to determine with respect to said second sensor (a) a first location coordinate, (b) a second location coordinate and (c) a depth coordinate for said eyes of said driver and (iii) said depth coordinate is determined based on said comparison.

\* \* \* \* \*